(12) United States Patent
Takahashi et al.

(10) Patent No.: US 7,382,704 B2
(45) Date of Patent: Jun. 3, 2008

(54) INFORMATION RECORDING MEDIUM, RECORDING APPARATUS, REPRODUCTION APPARATUS, RECORDING METHOD AND REPRODUCTION METHOD

(75) Inventors: Yoshihisa Takahashi, Osaka (JP); Motoshi Ito, Osaka (JP); Hiroshi Ueda, Nara (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 119 days.

(21) Appl. No.: 11/279,821

(22) Filed: Apr. 14, 2006

(65) Prior Publication Data

US 2006/0171282 A1  Aug. 3, 2006

Related U.S. Application Data

(63) Continuation of application No. 10/377,835, filed on Mar. 3, 2003, now Pat. No. 7,031,239.

(30) Foreign Application Priority Data

Mar. 20, 2002  (JP) .............................. 2002-079593

(51) Int. Cl.
*G06F 11/00* (2006.01)
(52) U.S. Cl. ..................... 369/53.17; 714/701; 714/710
(58) Field of Classification Search ..................... None
See application file for complete search history.

(56) References Cited

U.S. PATENT DOCUMENTS

| 5,319,626 A | 6/1994 | Ozaki et al. |
| 5,404,357 A | 4/1995 | Ito et al. |
| 5,914,928 A | 6/1999 | Takahashi |
| 6,581,167 B1 | 6/2003 | Gotoh et al. |
| 6,779,137 B2 | 8/2004 | Ko et al. |
| 6,842,580 B1 | 1/2005 | Ueda et al. |
| 6,978,404 B2 | 12/2005 | Ueda et al. |
| 7,031,239 B2* | 4/2006 | Takahashi et al. ....... 369/47.14 |
| 7,257,057 B2* | 8/2007 | Takahashi et al. ....... 369/47.14 |

FOREIGN PATENT DOCUMENTS

| EP | 1 132 914 A | 12/2001 |
| JP | 08-293187 A | 5/1996 |
| JP | 2000-132917 | 12/2000 |

OTHER PUBLICATIONS

European Search Report for corresponding Application No. EP 03 00 5475, mailed Nov. 16, 2004.
Sibling Continuation Application filed concurrently (claims attached).

* cited by examiner

*Primary Examiner*—William Korzuch
*Assistant Examiner*—Tawfik Goma
(74) *Attorney, Agent, or Firm*—Renner, Otto, Boisselle & Sklar, LLP

(57) ABSTRACT

A reproduction apparatus is provided for reproducing information recorded on an information recording medium. The information recording medium includes a data area for recording user data; and a defect management area for recording a defect list for managing N number of defect areas existing in the data area, where N is an integer number satisfying $N \geq 0$. The defect list includes two or more blocks and a header located at a fixed position in the defect list. The defect list further includes N number of defect entries, located subsequent to the header, including position information on the respective positions of the N number of defect areas; and an anchor located subsequent to the defect entries.

2 Claims, 16 Drawing Sheets

FIG.2A

Header

| | Defect list identifier (16 bits) | Defect entry number (16 bits) | 1st update times information (32 bits) |
|---|---|---|---|
| BP | 63      59              48 | 47              32 | 31                              0 |
| Val | 0100 0000 0000 0000 | • • • • | • • • • |

1st defect entry

| | 1st defect position information (32 bits) | | 1st substitute position information (32 bits) |
|---|---|---|---|
| BP | 63      59           48 | 47           32 | 31                              0 |
| Val | 0000 0111 1111 1111 • • • | 1111 | • • • • |

Anchor

| | Anchor identifier (16 bits) | Reserve information (16 bits) | 2nd update times information (32 bits) |
|---|---|---|---|
| BP | 63      59              48 | 47              32 | 31                              0 |
| Val | 1111 1111 1111 1111 | • • • • | • • • • |

Unused area

Padding data

| | |
|---|---|
| BP | 63   59                                                                0 |
| Val | 0000 0000 000 0000 • • • •      • • • • 0000 0000 0000 |

113, 127

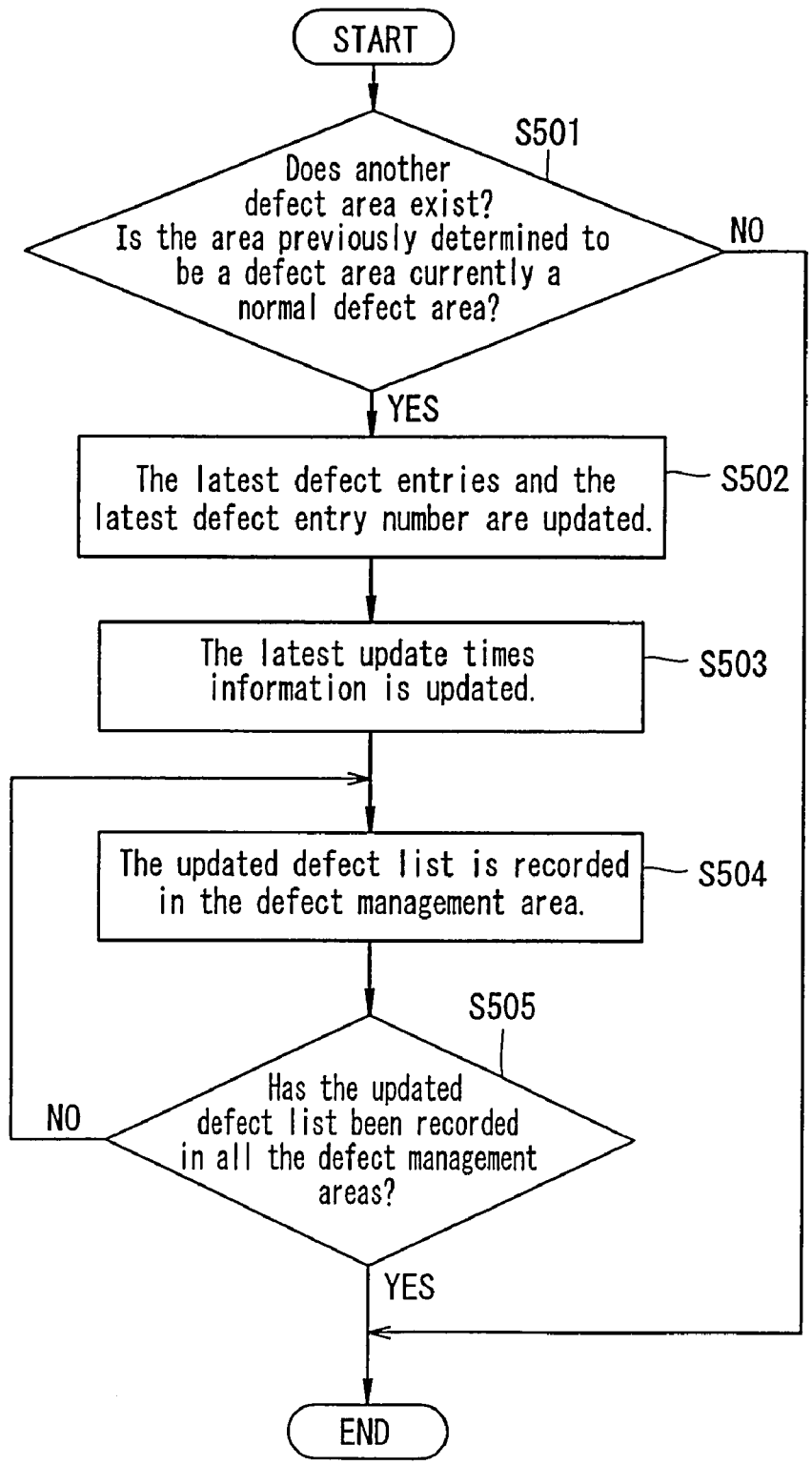

FIG. 6

| | (a) | | (b) | | (c) | |
|---|---|---|---|---|---|---|
| Header | Defect list identifier | 0x4000 | Defect list identifier | 0x4000 | Defect list identifier | 0x4000 |
| | Defect entry number | N | Defect entry number | N+1 | Defect entry number | N+1 |
| | 1st update times information | M | 1st update times information | M+1 | 1st update times information | M+1 |
| 1st defect entry | 1st defect position information | 0x0010 | 1st defect position information | 0x0010 | 1st defect position information | 0x0010 |
| | 1st substitute position information | 0x0800 | 1st substitute position information | 0x0800 | 1st substitute position information | 0x0800 |
| 2nd defect entry | 2nd defect position information | 0x0020 | 2nd defect position information | 0x0020 | 2nd defect position information | 0x0020 |
| | 2nd substitute position information | 0x0810 | 2nd substitute position information | 0x0810 | 2nd substitute position information | 0x0810 |
| | ⋮ | ⋮ | ⋮ | ⋮ | ⋮ | ⋮ |
| (N−1)th defect entry | (N−1)th defect position information | 0x0080 | (N−1)th defect position information | 0x0050 | (N−1)th defect position information | 0x0080 |
| | (N−1)th substitute position information | 0x0870 | (N−1)th substitute position information | 0x0840 | (N−1)th substitute position information | 0x0870 |
| Nth defect entry | Nth defect position information | 0x0090 | Nth defect position information | 0x0080 | Nth defect position information | 0x0090 |
| | Nth substitute position information | 0x0880 | Nth substitute position information | 0x0870 | Nth substitute position information | 0x0880 |
| Anchor | Anchor identifier | 0xFFFF | (N+1)th defect position information | 0x0090 | Anchor identifier | 0xFFFF |
| | 2nd update times information | M | (N+1)th substitute position information | 0x0880 | 2nd update times information | M |
| Unused area | Padding data | 0x0000 0x0000 ⋮ 0x0000 0x0000 | Anchor identifier | 0xFFFF | Padding data | 0x0000 0x0000 ⋮ 0x0000 0x0000 |
| | | | 2nd update times information | M+1 | | |
| | | | Padding data | 0x0000 0x0000 ⋮ 0x0000 0x0000 | | |

FIG. 7

| | (a) | | (b) | | (c) | |
|---|---|---|---|---|---|---|
| Header | Defect list identifier | 0×4000 | Defect list identifier | 0×4000 | Defect list identifier | 0×4000 |
| | Defect entry number | N | Defect entry number | N-1 | Defect entry number | N-1 |
| | 1st update times information | M | 1st update times information | M+1 | 1st update times information | M+1 |
| 1st defect entry | 1st defect position information | 0×0010 | 1st defect position information | 0×0010 | 1st defect position information | 0×0010 |
| | 1st substitute position information | 0×0800 | 1st substitute position information | 0×0800 | 1st substitute position information | 0×0800 |
| 2nd defect entry | 2nd defect position information | 0×0020 | 2nd defect position information | 0×0020 | 2nd defect position information | 0×0020 |
| | 2nd substitute position information | 0×0810 | 2nd substitute position information | 0×0810 | 2nd substitute position information | 0×0810 |
| | ⋮ | ⋮ | ⋮ | ⋮ | ⋮ | ⋮ |
| (N-1)th defect entry | (N-1)th defect position information | 0×0080 | (N-1)th defect position information | 0×0090 | (N-1)th defect position information | 0×0080 |
| | (N-1)th substitute position information | 0×0870 | (N-1)th substitute position information | 0×0880 | (N-1)th substitute position information | 0×0870 |
| Nth defect entry | Nth defect position information | 0×0090 | Anchor identifier | 0×FFFF | Nth defect position information | 0×0090 |
| | Nth substitute position information | 0×0880 | 2nd update times information | M+1 | Nth substitute position information | 0×0880 |
| Anchor | Anchor identifier | 0×FFFF | | 0×0000 0×0000 | Anchor identifier | 0×FFFF |
| | 2nd update times information | M | | | 2nd update times information | M |
| Unused area | Padding data | 0×0000 0×0000 ⋮ 0×0000 0×0000 | Padding data | ⋮ 0×0000 0×0000 | Padding data | 0×0000 0×0000 ⋮ 0×0000 0×0000 |

FIG. 8

| | (a) | | (b) | | (c) | |
|---|---|---|---|---|---|---|
| Header | Defect list identifier | 0×4000 | Defect list identifier | 0×4000 | Defect list identifier | 0×4000 |
| | Defect entry number | N | Defect entry number | N | Defect entry number | N |
| | 1st update times information | M | 1st update times information | M+1 | 1st update times information | M+1 |
| 1st defect entry | 1st defect position information | 0×0010 | 1st defect position information | 0×0010 | 1st defect position information | 0×0010 |
| | 1st substitute position information | 0×0800 | 1st substitute position information | 0×0800 | 1st substitute position information | 0×0800 |
| 2nd defect entry | 2nd defect position information | 0×0020 | 2nd defect position information | 0×0020 | 2nd defect position information | 0×0020 |
| | 2nd substitute position information | 0×0810 | 2nd substitute position information | 0×0810 | 2nd substitute position information | 0×0810 |
| | ⋮ | ⋮ | ⋮ | ⋮ | ⋮ | ⋮ |
| (N-1)th defect entry | (N-1)th defect position information | 0×0080 | (N-1)th defect position information | 0×0080 | (N-1)th defect position information | 0×0080 |
| | (N-1)th substitute position information | 0×0870 | (N-1)th substitute position information | 0×0F00 | (N-1)th substitute position information | 0×0870 |
| Nth defect entry | Nth defect position information | 0×0090 | Nth defect position information | 0×0090 | Nth defect position information | 0×0090 |
| | Nth substitute position information | 0×0880 | Nth substitute position information | 0×0880 | Nth substitute position information | 0×0880 |
| Anchor | Anchor identifier | 0×FFFF | Anchor identifier | 0×FFFF | Anchor identifier | 0×FFFF |
| | 2nd update times information | M | 2nd update times information | M+1 | 2nd update times information | M |
| Unused area | Padding data | 0×0000<br>0×0000<br>⋮<br>0×0000<br>0×0000 | Padding data | 0×0000<br>0×0000<br>⋮<br>0×0000<br>0×0000 | Padding data | 0×0000<br>0×0000<br>⋮<br>0×0000<br>0×0000 |

FIG.11

| | (a) | | (b) | | (c) | |
|---|---|---|---|---|---|---|
| Header | Defect list identifier | 0x4000 | Defect list identifier | 0x4000 | Defect list identifier | 0x4000 |
| | Defect entry number | N | Defect entry number | N+1 | Defect entry number | N+1 |
| | 1st update times information | M | 1st update times information | M+1 | 1st update times information | M+1 |
| 1st defect entry | 1st defect position information | 0x0010 | 1st defect position information | 0x0010 | 1st defect position information | 0x0010 |
| | 1st substitute position information | 0x0800 | 1st substitute position information | 0x0800 | 1st substitute position information | 0x0800 |
| 2nd defect entry | 2nd defect position information | 0x0020 | 2nd defect position information | 0x0020 | 2nd defect position information | 0x0020 |
| | 2nd substitute position information | 0x0810 | 2nd substitute position information | 0x0810 | 2nd substitute position information | 0x0810 |
| | ⋮ | ⋮ | ⋮ | ⋮ | ⋮ | ⋮ |
| (N-1)th defect entry | (N-1)th defect position information | 0x0080 | (N-1)th defect position information | 0x0050 | (N-1)th defect position information | 0x0080 |
| | (N-1)th substitute position information | 0x0870 | (N-1)th substitute position information | 0x0840 | (N-1)th substitute position information | 0x0870 |
| Nth defect entry | Nth defect position information | 0x0090 | Nth defect position information | 0x0080 | Nth defect position information | 0x0090 |
| | Nth substitute position information | 0x0880 | Nth substitute position information | 0x0870 | Nth substitute position information | 0x0880 |
| Unused area | Padding data | 0x0000 0x0000 ⋮ 0x0000 0x0000 | (N+1)th defect position information | 0x0090 | Padding data | 0x0000 0x0000 ⋮ 0x0000 0x0000 |
| | | | (N+1)th substitute position information | 0x0880 | | |
| | | | Padding data | 0x0000 ⋮ 0x0000 | | |
| Anchor | 2nd update times information | M | 2nd update times information | M+1 | 2nd update times information | M |

INFORMATION RECORDING MEDIUM, RECORDING APPARATUS, REPRODUCTION APPARATUS, RECORDING METHOD AND REPRODUCTION METHOD

This application is a continuation of U.S. application Ser. No. 10/377,835, filed Mar. 3, 2003 now U.S. Pat. No. 7,031,239.

BACKGROUND OF THE INVENTION

1. Field of the Invention

The present invention relates to an information recording medium, a recording apparatus, a reproduction apparatus, a recording method, and a reproduction method, providing improved information reliability. More specifically, the present invention relates to an information recording medium, a recording apparatus, a reproduction apparatus, a recording method, and a reproduction method, allowing for updating of a defect list having a size of 2ECC (Error Correction Code) or larger and deletion of a defect entry.

2. Description of the Related Art

Recently, large capacity replaceable information recording media and disc drive apparatuses for driving such information recording media are becoming more and more popular. As large capacity replaceable information recording media, optical discs such as, for example, DVDs (Digital Versatile Discs) are well known. A disc drive apparatus irradiates an optical disc with laser light and thus forms very small pits in the optical disc so as to record information. The disc drive apparatus also irradiates an optical disc with laser light and reproduces a change in the reflectance caused by the pits as information. Large capacity replaceable information recording media are suitable to a disc drive apparatus performing information recording and reproduction in this manner. However, since the optical discs are replaceable, a defect caused by dust or scratches may exist on a recording surface thereof.

In order to guarantee the reliability of information recorded or reproduced by the disc drive apparatus, it is necessary to perform defect management of managing a defect existing on the optical disc. The defect management used for a conventional disc drive apparatus is described in the physical standards of DVD-RAM (e.g., "DVD Specifications for Rewritable Disc (DVD-RAM) Part 1 PHYSICAL SPECIFICATIONS Version 2.0"; hereinafter, referred to as the "DVD-RAM Standards"). Chapter 5 of the DVD-RAM Standards includes a description on the layout of a disc.

FIG. 12 shows a data structure of an information recording medium 1200 according to the DVD-RAM Standards.

The information recording medium 1200 includes a lead-in area 1201 for recording information regarding the disc, a data area 1202 for recording user data, and a lead-out area 1203 showing the termination position of the user data.

The lead-in area 1201 includes DMA1 (Defect Management Area) and DMA2 for recording defect management information used for managing a defect area existing in the data area 1202, and reserved areas 1204 and 1205 for future expansion.

The data area 1202 includes a user area 1206 for recording user data and a spare area 1207. When there is a defect area in the user area 1206, the user data which is to be recorded in the defect area is recorded in the spare area 1207 instead of a portion of the user area 1206 corresponding to the defect area.

The lead-out area 1203 includes DMA3 and DMA4 for recording defect management information used for managing a defect area existing in the data area 1202, and reserved areas 1208 and 1209 for future expansion, like the lead-in area 1201.

DMA1 through DMA4 have the same defect management information recorded in multiplex. The reason for this is that the information recorded in DMA1 through DMA4 cannot be a target of defect management. Even if some of DMA1 through DMA4 have a defect area and the information recorded on the information recording medium cannot be reproduced, as long as at least one of DMA1 through DMA4 is defect-free, the defect management information recorded in that area can be normally reproduced. Accordingly, loss of user data is prevented, which improves reliability.

DMA1 includes a DDS (Data Definition Structure) 1210, a PDL (Primary Defect List) 1211, and an SDL (Secondary Defect List) 1212.

The DDS 1210 includes information regarding a partition defining the PDL 1211 and the SDL 1212.

The PDL 1211 is position information (list) of defect areas (for example, defect sectors) detected in the user area 1206 and the spare area 1207 at the time of shipping of the information recording medium, i.e., at the time of initialization of the information recording medium. This list basically does not change unless the information recording medium is subjected to physical formatting.

According to the DVD-RAM Standards, the total size of the DDS 1210 and the PDL 1211 fits in one ECC (Error Correction Code) block. The size of the SDL 1212 also fits in one ECC block. An ECC block is a unit of error correction in DVD-RAM, and has a size of 32 kbytes in 16 sectors (each sector has a size of 2 kbytes). This size of one ECC block will be referred to as "1ECC size".

FIG. 13 shows a detailed data structure of the SDL 1212.

Unlike the PDL 1211, the SDL 1212 is information (list) which changes when a defect area (for example, defect sector) is detected during recording or reproduction. When a defect area is detected, the SDL 1212 is written in each of DMA1 through DMA4 at a timing appropriate to the disc drive apparatus used.

The SDL 1212 includes a header 1301, a first defect entry 1302, a second defect entry 1303, . . . , an Nth defect entry 1304, and an unused area 1305.

The header 1301 includes, for example, an identifier which represents that the area is the SDL 1212, the total number of defect entries (N in the case of FIG. 13), and the number of times the SDL 1212 has been updated.

The first defect entry 1302 includes first defect position information 1306 showing the position of a defect area existing in the user area 1206 and first substitute position information 1307 showing the position of a part of the spare area 1207 in which the user data has been recorded instead of the defect area (for example, a substitute sector). The second defect entry 1303 includes second defect position information and second substitute position information. The Nth defect entry includes Nth defect position information and Nth substitute position information. Each of the defect position information and the substitute position information is generally a sector number.

The unused area 1305 exists in the case where the total size of the header 1301 and the first through Nth defect entries 1302 through 1304 is less than 1ECC size. In this case, padding data (for example, 0) which is meaningless information is recorded in the unused area 1305.

There is a risk that while the disc drive apparatus is writing the SDL 1212 in DMA1 through DMA4 of the information recording medium 1200, the power of the disc drive apparatus may be turned off and processing may be interrupted. In such a case, the disc drive apparatus determines the update result of the defect management areas (DMA1 through DMA4) by the following procedure.

(1) Error correction is performed on the SDL 1212 having 1ECC size. When the error correction is accurately performed, the SDL 1212 is determined to have been updated normally.

(2) The step of (1) is performed on all the SDLs included in DMA1 through DMA4.

(3) Regarding all the SDLs determined to have been updated normally in step (2), the numbers of updates of the SDLs included in the header are compared with one another. The SDL having the largest number of updates is determined to be the correct SDL (latest SDL).

As described above, when the size of the SDL 1212 is 1ECC size, the determination of the correct SDL can be performed accurately even when the power of the disc drive apparatus is turned off. Thus, the reliability of user data is guaranteed with no user data being lost.

Recently, as the amount of information to be recorded on information recording media is increased, high density recording technology and large capacity technology have remarkably improved. For example, using blue lasers, information recording media having a larger capacity than that of conventional optical discs are now under development. Since such an information recording medium allows a larger capacity of information to be recorded thereon, the size of the SDL is larger than 1ECC size. As long as the size of the SDL is 1ECC size or smaller as according to the DVD-RAM Standards, no problem arises. When the size of the SDL exceeds 1ECC size, the following problems occur. In the following case, the size of the SDL is assumed to be 4ECC size.

It is assumed that the following occurs to one DMA (for example, DMA1) as a result of the size of the SDL becoming 4ECC size instead of the conventional 1ECC size.

The header is completely updated.

The SDL is updated up to 2ECC blocks, and the power of the disc drive apparatus is turned off exactly when the third ECC block is starting to be updated.

In this case, according to the conventional method of determining the SDL update result, error correction in units of 1ECC is normally performed. Comparing the number of updates of the SDL in DMA1 with that of the SDLs in DMA2 through DMA4, the number of updates of the SDL in DMA1 is maximum. Therefore, although the updating of the SDL in DMA1 fails in the middle, the SDL in DMA1 is erroneously determined to be the normal, latest SDL.

One solution proposed to solve this problem is to add a header for each ECC block of the SDL having 4ECC size. Each header includes, for example, an identifier which represents that the area is the SDL, the total number of defect entries, and the number of updates of the SDL.

FIG. 14 shows a data structure of an SDL 1400 having 4ECC size.

The SDL 1400 includes a first ECC block 1401, a second ECC block 1402, a third ECC block 1403, and a fourth ECC block 1404.

The first ECC block 1401 includes a header 1405, a first defect entry 1406, a second defect entry 1407, . . . , an (M−1)th defect entry 1408, and an Mth defect entry 1409.

The second ECC block 1402 includes a header 1410, an (M+1)th defect entry 1411, . . . , an Nth defect entry 1412, and an unused area 1413.

The third ECC block 1403 includes a header 1414 and an unused area 1415.

The fourth ECC block 1404 includes a header 1416 and an unused area 1417.

The headers 1405, 1410, 1414 and 1416 each include, for example, an identifier which represents that the area is the SDL, the total number of defect entries, and the number of updates of the SDL. The first through Nth defect entries 1406 through 1409, 1411 and 1412 each include defect position information and substitute position information. In the unused areas 1413, 1415 and 1417, padding data (for example, 0) which is meaningless information is recorded.

In this case, the disc drive apparatus determines the update result of the defect management areas (DMA1 through DMA4) by the following procedure.

(1) For the SDL 1400 having 4ECC size, error correction is performed on the first ECC block 1401. When the error correction is accurately performed, the first ECC block 1401 is determined to have been updated normally. This step is performed on the second through fourth ECC blocks 1402 through 1404 in the SDL 1400. When the error correction on the first through fourth ECC blocks 1401 through 1404 is accurately performed, the step (2) is performed.

(2) The numbers of updates of the headers 1405, 1410, 1414 and 1416 respectively added to the first through fourth ECC blocks 1401 through 1404 are compared with one another. When the numbers of updates of the headers 1405, 1410, 1414 and 1416 are all of the same value, the SDL 1400 is determined to have been updated normally.

(3) Steps (1) and (2) are performed on all the SDLs in DMA2 through DMA4.

(4) Regarding the SDLs determined to have been updated normally in step (3), the numbers of updates of the SDLs included in the header are compared with one another. The SDL having the largest number of updates is determined to be the correct SDL (latest SDL).

As described above, when the size of the SDL 1400 exceeds 1ECC size, a header is provided for each 1ECC block of the SDL, so that the correct SDL can be determined even when the power of the disc drive apparatus is turned off. Thus, the reliability of user data is guaranteed with no user data being lost.

There is another conventional technology for improving the reliability of data (see, for example, Japanese Laid-Open Publication No. 8-293187).

FIG. 15 shows a data structure of another conventional information recording medium 1500.

The structure of the information recording medium 1500 is identical with the structure of the information recording medium 1200 except for the structure of an SDL 1501 and except that the size of the SDL 1501 is not limited to 1ECC size. Regarding FIG. 15, identical elements previously discussed with respect to FIG. 12 bear identical reference numerals and the detailed descriptions thereof will be omitted.

The SDL 1501 includes a defect list identifier 1502 which represents that the area is the SDL 1501, a reserved field 1503 for future expansion, first update information 1504 and second update information 1510 for determining whether defect management information is old or new, a registered defect number 1505 which represents the number of defect sectors registered in the SDL 1501, first defect position information 1506 and second defect position information 1508 which represent the position of a defect sector, first substitute position information 1507 and second substitute position information 1509 which represent the position of a substitute sector for substituting the defect sector, and an unused field 1511 for registering defect sectors which may be detected in the future. The first update information 1504 and the second update information 1510 are, for example, numbers of times of recording. As long as the SDL 1501 is updated normally, the content of the first update information 1504 and the content of the second update information 1510 are identical to each other.

In this case, the disc drive apparatus determines the update result of the defect management areas (DMA1 through DMA4) by the following procedure.

(1) Regarding the SDL 1501, the content of the first update information 1504 and the content of the second update information 1510 are compared with one another. When the content of the first update information 1504 and the content of the second update information 1510 are identical to each other, the SDL 1501 is determined to have been updated normally.

(2) Step (1) is performed on all the SDLs in DMA2 through DMA4.

(3) Regarding the SDLs determined to have been updated normally in step (2), the contents of the update information in the SDLs are compared with one another. The SDL having the largest amount of update information is determined to be the correct SDL (latest SDL).

As described above, as long as the first update information and the second update information added to the SDL included in one of DMA1 through DMA4 are correctly read, the determination of the correct SDL can be performed accurately, regardless of the size of the SDLs.

However, the SDL 1400 shown in FIG. 14 has the following problems. A header needs to be added to all of the four ECC blocks included in the SDL 1400. This lowers the processing efficiency of updating the SDL 1400. In addition, a header (for example, the header 1410) is provided between one defect entry (for example, the Mth defect entry 1409) and another defect entry (for example, the (M+1)th defect entry 1411). Due to this structure, the operations of, for example, searching for, adding, and deleting a defect entry are complicated.

The information recording medium 1500 shown in FIG. 15 has the problem that the second update information 1511 may not be correctly read.

FIG. 16 shows data structures of defect lists in various states of the SDL 1501 in the information recording medium 1500 shown in FIG. 15. Part (a) shows a data structure of a pre-update defect list. Part (b) shows a data structure of a defect list which was updated normally. Part (c) shows a data structure of a defect list which was not updated normally. With reference to FIG. 16, how the SDL 1501 is updated, in the case where a sector which was previously determined as being registered as a defect area and then determined as being normal later, will be described.

The data structure of the SDL 1501 shown in part (a) of FIG. 16 is the same as that shown in FIG. 15. In part (a) of FIG. 16, the content of the first update information 1504 and the second update information 1510 are both M, and the registered defect number 1505 is 2.

Part (b) of FIG. 16 shows a post-update data structure of the SDL 1501 in the case where the SDL 1501 is updated normally. The content of the first update information 1504 is updated from M to M+1. The registered defect number 1505 is updated from 2 to 1. The position information of the defect sector which has been determined as being normal (second defect position information 1508) and the position information of the substitute sector for substituting that sector (second substitute position information 1509) are deleted. Thus, the first defect position information 1506 and the first defect position information 1507 are left. The content of the second update information 1510 is updated from M to M+1, like the first update information 1504. The second update information 1510 is located subsequent to the first substitute position information 1507. The unused field 1511 is increased by the size corresponding to the second defect position information 1508 and the second substitute position information 1509 which have been deleted.

Part (c) of FIG. 16 shows a post-update data structure of the SDL 1501 in the case where the SDL 1501 is not updated normally. It is assumed that immediately after the registered defect number 1505 is updated, the disc drive apparatus is turned off. In this case, the first update information 1504 and the registered defect number 1505 are updated normally as in part (b) of FIG. 16. However, the second defect position information 1508, the second substitute position information 1509, the second update information 1510 and the unused field 1511 remain the same as those in the pre-update data structure shown in part (a) of FIG. 16.

In the case of the data structure shown in part (c) of FIG. 16, determination on the update result is performed. The disc drive apparatus uses, for example, the updated registered defect number 1505 to read the second defect position information 1508 as the second update information 1510. The disc drive apparatus compares the content of the first update information 1504 and the content of the second defect position information 1508 read as the second update information 1510. When the content of the first update information 1504 and the content of the second defect position information 1508 unfortunately match each other, the disc drive apparatus determines that the SDL 1501 has been updated normally even though the updating of the SDL 1501 was a failure.

In the case where the information recording medium 1500 shown in FIG. 15 considers error correction of the size of 1ECC and the size of the SDL 1501 does not exceed 1ECC size, the problem described above with reference to part (c) of FIG. 16 does not occur. However, when the size of the SDL 1501 exceeds 1ECC size, the above-described problem occurs.

SUMMARY OF THE INVENTION

According to one aspect of the invention, an information recording medium includes a data area for recording user data, and a defect management area for recording a defect list for managing N number of defect areas existing in the data area, where N is an integer satisfying $N \geq 0$. The defect list includes a header located at a fixed position in the defect list, N number of defect entries respectively including position information on positions of the N number of defect areas, and an anchor. The header, the N number of defect entries, and the anchor are located in this order in the defect list. The header includes a defect list identifier for identifying the defect list, first update times information representing the number of times which the defect list has been updated, and a defect entry number representing the number of the N number of defect entries. The anchor includes an anchor identifier for identifying the anchor of the defect list, and second update times information representing the number of times which the defect list has been updated.

In one embodiment of the invention, the defect list includes at least two blocks, and the defect list is recorded in units of one block.

According to another aspect of the invention, a recording apparatus for recording information on an information recording medium is provided. The information recording medium includes a data area for recording user data, and a defect management area for recording a defect list for managing N number of defect areas existing in the data area, where N is an integer satisfying N≧0. The defect list includes a header located at a fixed position in the defect list, N number of defect entries respectively including position information on positions of the N number of defect areas, and an anchor. The header, the N number of defect entries, and the anchor are located in this order in the defect list. The header includes a defect list identifier for identifying the defect list, first update times information representing the number of times which the defect list has been updated, and a defect entry number representing the number of the N number of defect entries. The anchor includes an anchor identifier for identifying the anchor of the defect list, and second update times information representing the number of times which the defect list has been updated. The recording apparatus includes a recording section for recording the information on the information recording medium, a storage section for storing the information to be recorded on the information recording medium, and a latest defect list, and a control section for controlling execution of defect management processing which is performed using the recording section and the storage section. The latest defect list includes a latest header, P number of latest defect entries, and a latest anchor, wherein P is an integer satisfying P≧0 where P=N or P≠N. The latest header includes first latest update times information and a latest defect entry number P. The latest anchor includes second update times information having a content identical to that of the first update times information. The defect management processing includes the steps of (a) determining (i) whether another defect area exists in the data area, (ii) whether a normal defect area exists among the N number of defect areas, or (iii) neither (i) nor (ii) is the case, (b) when it is determined in the step (a) that another defect area exists in the data area, or that a normal defect area exists among the N number of defect areas, updating the P number of latest defect entries into P' number of latest defect entries, where P' is an integer satisfying P'≧0 where P=P' or P≠P'; and updating the latest defect entry number from P to P'; (c) incrementing, by one, each of the first latest update times information and the second latest update times information, and (d) recording the latest defect list updated in the steps (b) and (c) in the defect management area.

In one embodiment of the invention, the step (d) includes the step of recording the updated latest defect list in the defect management area in the order of the updated latest header, the updated P' number of latest defect entries, and the updated latest anchor, or in the order of the updated latest anchor, the updated P' number of latest defect entries, and the updated latest header.

In one embodiment of the invention, the step (b) includes the step of, when it is determined in the step (a) that another defect area exists in the data area, adding another defect entry to the latest defect list.

In one embodiment of the invention, the step (b) includes the step of, when it is determined in the step (a) that a normal defect area exists among the N number of defect areas, deleting a defect entry including position information on a position of the normal defect area from the P number of latest defect entries.

In one embodiment of the invention, the information recording medium further includes another defect management area for recording a defect list having a content identical to that of the defect list recorded in the defect management area. The control section controls execution of the step (d) for the another defect management area.

According to still another aspect of the invention, a recording method for recording information on an information recording medium is provided. The information recording medium includes a data area for recording user data, and a defect management area for recording a defect list for managing N number of defect areas existing in the data area, where N is an integer satisfying N≧0. The defect list includes a header located at a fixed position in the defect list, N number of defect entries respectively including position information on positions of the N number of defect areas, and an anchor. The header, the N number of defect entries, and the anchor are located in this order in the defect list. The header includes a defect list identifier for identifying the defect list, first update times information representing the number of times which the defect list has been updated, and a defect entry number representing the number of the N number of defect entries. The anchor includes an anchor identifier for identifying the anchor of the defect list, and second update times information representing the number of times which the defect list has been updated. The recording is performed using a latest defect list. The latest defect list includes a latest header, P number of latest defect entries, and a latest anchor, wherein P is an integer satisfying P≧0 where P=N or P≠N. The latest header includes the first update times information and a latest defect entry number P. The latest anchor includes second update times information having a content identical to that of the first update times information. The recording method includes the steps of (a) determining (i) whether another defect area exists in the data area, (ii) whether a normal defect area exists among the N number of defect areas, or (iii) neither (i) nor (ii) is the case, (b) when it is determined in the step (a) that another defect area exists in the data area, or that a normal defect area exists among the N number of defect areas, updating the P number of latest defect entries into P' number of latest defect entries, where P' is an integer satisfying P'≧0 where P=P' or P≠P'; and updating the latest defect entry number from P to P'; (c) incrementing, by one, each of the first latest update times information and the second latest update times information, and (d) recording the latest defect list updated in the steps (b) and (c) in the defect management area.

In one embodiment of the invention, the step (d) includes the step of recording the updated latest defect list in the defect management area in the order of the updated latest header, the updated P' number of latest defect entries, and the updated latest anchor, or in the order of the updated latest anchor, the updated P' number of latest defect entries, and the updated latest header.

In one embodiment of the invention, the step (b) includes the step of, when it is determined in the step (a) that another defect area exists in the data area, adding another defect entry to the latest defect list.

In one embodiment of the invention, the step (b) includes the step of, when it is determined in the step (a) that a normal defect area exists among the N number of defect areas, deleting a defect entry including position information on a position of the normal defect area from the P number of latest defect entries.

In one embodiment of the invention, the information recording medium further includes another defect management area for recording a defect list having a content identical to that of the defect list recorded in the defect management area. The control section controls execution of the step (d) for the another defect management area.

According to still another aspect of the invention, a reproduction apparatus for reproducing information recorded on an information recording medium is provided.

The information recording medium includes a data area for recording user data, and a defect management area for recording a defect list for managing N number of defect areas existing in the data area, where N is an integer satisfying $N \geq 0$. The defect list includes a header, N number of defect entries respectively including position information on positions of the N number of defect areas, and an anchor. The header located at a fixed position in the defect list, the N number of defect entries, and the anchor are located in this order in the defect list. The header includes a defect list identifier for identifying the defect list, first update times information representing the number of times which the defect list has been updated, and a defect entry number representing the number of the N number of defect entries. The anchor includes an anchor identifier for identifying the anchor of the defect list, and second update times information representing the number of times which the defect list has been updated. The reproduction apparatus includes a reproduction section for reproducing the information recorded on the information recording medium, a storage section for storing the reproduced information, and a control section for controlling execution of defect management processing which is performed using the reproduction section and the storage section, the control section having an inherent defect list identifier for identifying the defect list and an inherent anchor identifier for identifying the anchor of the defect list. The defect management processing includes the steps of (a) reproducing the defect list identifier, the defect entry number, and the first update times information which are included in the header, and determining whether or not a content of the inherent defect list identifier matches a content of the reproduced defect list identifier, (b) calculating a position of the anchor in the defect list using the reproduced defect entry number when it is determined in the step (a) that the content of the inherent defect list identifier matches the content of the reproduced defect list identifier, (c) reproducing the anchor identifier and the second update times information based on the calculated position of the anchor, and determining whether or not a content of the inherent anchor identifier matches a content of the reproduced anchor identifier, (d) determining whether or not a content of the first update times information matches a content of the second update times information when it is determined in the step (c) that the content of the inherent anchor identifier matches the content of the reproduced anchor identifier, and (e) specifying the defect list recorded in the defect management area as the latest defect list when it is determined in the step (d) that the content of the first update times information matches the content of the second update times information.

In one embodiment of the invention, the information recording medium further includes another defect management area for recording a defect list having a content identical to that of the defect list recorded in the defect management area. The control section controls execution of the defect management processing for the another defect management area. The step (e) includes the steps of ($e_1$) performing the steps (a) through (d) for the another defect management area, and ($e_2$) specifying the defect list including the update times information having a largest number of updates as the latest defect list.

According to still another aspect of the invention, a reproduction method for reproducing information recorded on an information recording medium is provided. The information recording medium includes a data area for recording user data, and a defect management area for recording a defect list for managing N number of defect areas existing in the data area, where N is an integer satisfying $N \geq 0$. The defect list includes a header, N number of defect entries respectively including position information on positions of the N number of defect areas, and an anchor. The header located at a fixed position in the defect list, the N number of defect entries, and the anchor are located in this order in the defect list. The header includes a defect list identifier for identifying the defect list, first update times information representing the number of times which the defect list has been updated, and a defect entry number representing the number of the N number of defect entries. The anchor includes an anchor identifier for identifying the anchor of the defect list, and second update times information representing the number of times which the defect list has been updated. The reproduction method includes the steps of (a) reproducing the defect list identifier, the defect entry number, and the first update times information which are included in the header, and determining whether or not a content of an inherent defect list identifier for identifying the defect list matches a content of the reproduced defect list identifier, (b) calculating a position of the anchor in the defect list using the reproduced defect entry number when it is determined in the step (a) that the content of the inherent defect list identifier matches the content of the reproduced defect list identifier, (c) reproducing the anchor identifier and the second update times information based on the calculated position of the anchor, and determining whether or not a content of an inherent anchor identifier for identifying the anchor of the defect list matches a content of the reproduced anchor identifier, (d) determining whether or not a content of the first update times information matches a content of the second update times information when it is determined in the step (c) that the content of the inherent anchor identifier matches the content of the reproduced anchor identifier, and (e) specifying the defect list recorded in the defect management area as the latest defect list when it is determined in the step (d) that the content of the first update times information matches the content of the second update times information.

In one embodiment of the invention, the information recording medium further includes another defect management area for recording a defect list having a content identical to that of the defect list recorded in the defect management area. The step (e) includes the steps of ($e_1$) performing the steps (a) through (d) for the another defect management area, and ($e_2$) specifying the defect list including the update times information having a largest number of updates as the latest defect list.

According to still another aspect of the invention, an information recording medium includes a data area for recording user data, and a defect management area for recording a defect list for managing N number of defect areas existing in the data area, where N is an integer satisfying $N \geq 0$. The defect list includes a header located at a fixed position in the defect list, N number of defect entries respectively including position information on positions of the N number of defect areas, and an anchor located at a fixed position in the defect list. The header, the N number of defect entries, and the anchor are located in this order in the defect list. The header includes a defect list identifier for identifying the defect list, first update times information representing the number of times which the defect list has been updated, and a defect entry number representing the number of the N number of defect entries. The anchor includes second update times information representing the number of times which the defect list has been updated.

In one embodiment of the invention, the defect list includes at least two blocks, and the defect list is recorded in units of one block.

According to still another aspect of the invention, a recording apparatus for recording information on an information recording medium is provided. The information recording medium includes a data area for recording user data, and a defect management area for recording a defect list for managing N number of defect areas existing in the data area, where N is an integer satisfying $N \geq 0$. The defect list includes a header located at a fixed position in the defect list, N number of defect entries respectively including position information on positions of the N number of defect areas, and an anchor located at a fixed position in the defect list. The header, the N number of defect entries, and the anchor are located in this order in the defect list. The header includes a defect list identifier for identifying the defect list, first update times information representing the number of times which the defect list has been updated, and a defect entry number representing the number of the N number of defect entries. The anchor includes second update times information representing the number of times which the defect list has been updated. The recording apparatus includes a recording section for recording the information on the information recording medium, a storage section for storing the information to be recorded on the information recording medium, and a latest defect list, and a control section for controlling execution of defect management processing which is performed using the recording section and the storage section. The latest defect list includes a latest header, P number of latest defect entries, and a latest anchor, wherein P is an integer satisfying $P \geq 0$ where P=N or P≠N. The latest header includes first latest update times information and a latest defect entry number P. The latest anchor includes second update times information having a content identical to that of the first update times information. The defect management processing includes the steps of (a) determining (i) whether another defect area exists in the data area, (ii) whether a normal defect area exists among the N number of defect areas, or (iii) neither (i) nor (ii) is the case, (b) when it is determined in the step (a) that another defect area exists in the data area, or that a normal defect area exists among the N number of defect areas, updating the P number of latest defect entries into P' number of latest defect entries, where P' is an integer satisfying $P' \geq 0$ where P=P' or P≠P'; and updating the latest defect entry number from P to P'; (c) incrementing, by one, each of the first latest update times information and the second latest update times information, and (d) recording the latest defect list updated in the steps (b) and (c) in the defect management area.

In one embodiment of the invention, the step (d) includes the step of recording the updated latest defect list in the defect management area in the order of the updated latest header, the updated P' number of latest defect entries, and the updated latest anchor, or in the order of the updated latest anchor, the updated P' number of latest defect entries, and the updated latest header.

In one embodiment of the invention, the information recording medium further includes another defect management area for recording a defect list having a content identical to that of the defect list recorded in the defect management area. The control section controls execution of the step (d) for the another defect management area.

According to still another aspect of the invention, a recording method for recording information on an information recording medium is provided. The information recording medium includes a data area for recording user data, and a defect management area for recording a defect list for managing N number of defect areas existing in the data area, where N is an integer satisfying $N \geq 0$. The defect list includes a header located at a fixed position in the defect list, N number of defect entries respectively including position information on positions of the N number of defect areas, and an anchor located at a fixed position in the defect list. The header, the N number of defect entries, and the anchor are located in this order in the defect list. The header includes a defect list identifier for identifying the defect list, first update times information representing the number of times which the defect list has been updated, and a defect entry number representing the number of the N number of defect entries. The anchor includes second update times information representing the number of times which the defect list has been updated. The recording is performed using a latest defect list. The latest defect list includes a latest header, P number of latest defect entries, and a latest anchor, wherein P is an integer satisfying $P \geq 0$ where P=N or P≠N. The latest header includes the first update times information and a latest defect entry number P. The latest anchor includes second update times information having a content identical to that of the first update times information. The recording method includes the steps of (a) determining (i) whether another defect area exists in the data area, (ii) whether a normal defect area exists among the N number of defect areas, or (iii) neither (i) nor (ii) is the case, (b) when it is determined in the step (a) that another defect area exists in the data area, or that a normal defect area exists among the N number of defect areas, updating the P number of latest defect entries into P' number of latest defect entries, where P' is an integer satisfying $P' \geq 0$ where P=P' or P≠P'; and updating the latest defect entry number from P to P'; (c) incrementing, by one, each of the first latest update times information and the second latest update times information, and (d) recording the latest defect list updated in the steps (b) and (c) in the defect management area.

In one embodiment of the invention, the step (d) includes the step of recording the updated latest defect list in the defect management area in the order of the updated latest header, the updated P' number of latest defect entries, and the updated latest anchor, or in the order of the updated latest anchor, the updated P' number of latest defect entries, and the updated latest header.

In one embodiment of the invention, the information recording medium further includes another defect management area for recording a defect list having a content identical to that of the defect list recorded in the defect management area. The method further comprises the step of executing the step (d) for the another defect management area.

According to still another aspect of the invention, a reproduction apparatus for reproducing information recorded on an information recording medium is provided. The information recording medium includes a data area for recording user data, and a defect management area for recording a defect list for managing N number of defect areas existing in the data area, where N is an integer satisfying $N \geq 0$. The defect list includes a header located at a fixed position in the defect list, N number of defect entries respectively including position information on positions of the N number of defect areas, and an anchor located at a fixed position in the defect list. The header, the N number of defect entries, and the anchor are located in this order in the defect list. The header includes a defect list identifier for identifying the defect list, first update times information representing the number of times which the defect list has been updated, and a defect entry number representing the number of the N number of defect entries. The anchor includes second update times information representing the number of times which the defect list has been updated. The reproduction apparatus includes a reproduction section for reproducing the information recorded on the information recording medium, a storage section for storing the reproduced information, and a control section for controlling execution of defect management processing which is performed using the reproduction section and the storage section, the control section having an inherent defect list identifier for identifying the defect list. The defect management processing includes the steps of (a) reproducing the defect list identifier, the defect entry number, and the first update times information which are included in the header, and determining whether or not a content of the inherent defect list identifier matches a content of the reproduced defect list identifier, (b) reproducing the second update times information included in the anchor and determining whether or not a content of the first update times information matches a content of the second update times information when it is determined in the step (a) that the content of the inherent defect list identifier matches the content of the reproduced defect list identifier, and (c) specifying the defect list recorded in the defect management area as the latest defect list when it is determined in the step (b) that the content of the first update times information matches the content of the second update times information.

In one embodiment of the invention, the information recording medium further includes another defect management area for recording a defect list having a content identical to that of the defect list recorded in the defect management area. The control section controls execution of the defect management processing for the another defect management area. The step (c) includes the steps of ($c_1$) performing the steps (a) and (b) for the another defect management area, and ($c_2$) specifying the defect list including the update times information having a largest number of updates as the latest defect list.

According to still another aspect of the invention, a reproduction method for reproducing information recorded on an information recording medium is provided. The information recording medium includes a data area for recording user data, and a defect management area for recording a defect list for managing N number of defect areas existing in the data area, where N is an integer satisfying $N \geq 0$. The defect list includes a header located at a fixed position in the defect list, N number of defect entries respectively including position information on positions of the N number of defect areas, and an anchor located at a fixed position in the defect list. The header, the N number of defect entries, and the anchor are located in this order in the defect list. The header includes a defect list identifier for identifying the defect list, first update times information representing the number of times which the defect list has been updated, and a defect entry number representing the number of the N number of defect entries. The anchor includes second update times information representing the number of times which the defect list has been updated. The reproduction method includes the steps of (a) reproducing the defect list identifier, the defect entry number, and the first update times information which are included in the header, and determining whether or not a content of an inherent defect list identifier for identifying the defect list matches a content of the reproduced defect list identifier, (b) reproducing the second update times information included in the anchor and determining whether or not a content of the first update times information matches a content of the second update times information when it is determined in the step (a) that the content of the inherent defect list identifier matches the content of the reproduced defect list identifier, and (c) specifying the defect list recorded in the defect management area as the latest defect list when it is determined in the step (b) that the content of the first update times information matches the content of the second update times information.

In one embodiment of the invention, the information recording medium further includes another defect management area for recording a defect list having a content identical to that of the defect list recorded in the defect management area. The step (c) includes the steps of ($c_1$) performing the steps (a) and (b) for the another defect management area, and ($c_2$) specifying the defect list including the update times information having a largest number of updates as the latest defect list.

Thus, the invention described herein makes possible the advantages of providing an information recording medium, a recording apparatus, a reproduction apparatus, a recording method, and a reproduction method, allowing for updating of an SDL (defect list) having a size of 2ECC or larger and deletion of a defect entry.

These and other advantages of the present invention will become apparent to those skilled in the art upon reading and understanding the following detailed description with reference to the accompanying figures.

BRIEF DESCRIPTION OF THE DRAWINGS

FIGS. 2A through 2D show detailed data structures of a header 121, a first defect entry 122, an anchor 126, and an unused area 113;

FIG. 5 is flowchart illustrating a procedure of defect management processing for updating the latest defect list in the first example;

FIG. 6 shows a data structure of a defect list, during the processing for adding a defect entry in the first example, in various states of (a) before update, (b) when the defect list has been updated normally and (c) when the defect list has not been updated normally;

FIG. 7 shows a data structure of a defect list, during the processing for deleting a defect entry in the first example, in various states of (a) before update, (b) when the defect list has been updated normally and (c) when the defect list has not been updated normally;

FIG. 8 shows a data structure of a defect list, during the processing for changing a defect entry in the first example, in various states of (a) before update, (b) when the defect list has been updated normally and (c) when the defect list has not been updated normally;

FIG. 11 shows a data structure of a defect list, during the processing for adding a defect entry in the second example, in various states of (a) before update, (b) when the defect list has been updated normally and (c) when the defect list has not been updated normally;

DESCRIPTION OF THE PREFERRED EMBODIMENTS

Hereinafter, the present invention will be described by way of illustrative examples with reference to the accompanying drawings.

EXAMPLE 1

(1) Information Recording Medium

Figure 1:
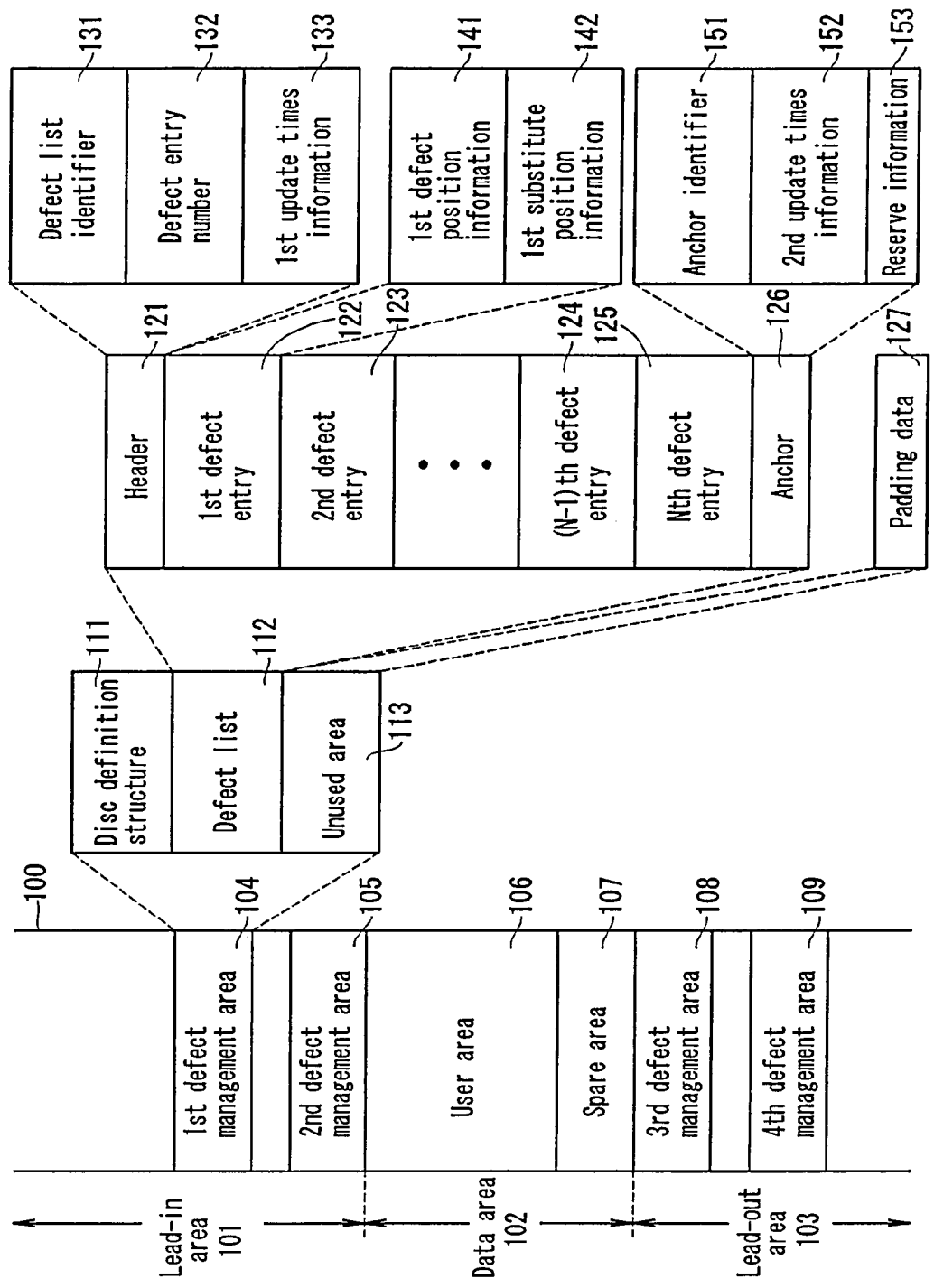
FIG. 1 shows a data structure of an information recording medium 100 according to a first example of the present invention.

FIG. 1 shows a data structure of an information recording medium 100 according to a first example of the present invention.

The information recording medium (optical disc) 100 may be, for example, a rewritable optical disc. The optical disc 100 is assumed to be subjected to error correction in units of 1ECC block. An ECC block is a unit of error correction in the field of optical discs. An ECC block has, for example, a size of 32 kbytes in 16 sectors (each sector has a size of 2 kbytes). This size of one ECC block will be referred to as "1ECC size", hereinafter. It is assumed that the recording of information on the optical disc 100 and updating of the information on the optical disc 100 are performed in units of 1ECC.

The data structure shown in FIG. 1 is the structure of the optical disc 100 after position information on N number of defect areas in a defect management area is normally recorded (N is an integer satisfying $N \geq 0$). A defect area is, for example, a defect sector.

The optical disc 100 includes a data area 102 for recording user data, and a lead-in area 101 and a lead-out area 103 acting as a buffer area when a recording and reproduction apparatus (not shown) overruns by the movement of an optical head (not shown).

The data area 102 includes a user area 106 for recording user data and a spare area 107. When there is a defect area (for example, a defect sector) in the user area 106, the user data which is to be recorded in the defect area is recorded in the spare area 107 instead of a portion of the user area 106 corresponding to the defect area.

The lead-in area 101 includes a first defect management area 104 and a second defect management area 105 for recording defect management information used for managing a defect area existing in the data area 102.

The lead-out area 103 includes a third defect management area 108 and a fourth defect management area 109 for recording defect management information used for managing a defect area existing in the data area 102, like the lead-in area 101.

The first defect management area 104, the second defect management area 105, the third defect management area 108, and the fourth defect management area 109 are respectively located at physically specific positions on the optical disc 100.

In the first defect management area 104, the second defect management area 105, the third defect management area 108 and the fourth defect management area 109, the same information for defect management is recorded in multiplex. The reason for this is, as described above, that the information recorded in the first, second, third and fourth defect management areas 104, 105, 108, and 109 cannot be a target of defect management. Even if some of the first, second, third and fourth defect management areas 104, 105, 108, and 109 have a defect area and the information recorded in the defect area cannot be reproduced, as long as at least one of the four defect management areas is defect-free, the defect management information recorded in that area can be normally reproduced. Accordingly, loss of the user data is prevented, which improves reliability. In the first example, the optical disc 100 includes the four defect management areas 104, 105, 108, and 109, but the number of defect management areas may be any number of one or more.

In the first defect management area 104, a disc definition structure 111 and a defect list 112 for managing N number of defect areas existing in the data area 102 (N is an integer satisfying $N \geq 0$) are recorded. The first defect management area 104 includes an unused area 113.

The disc definition structure 111 is information representing the disc structure, for example, whether or not the disc 100 has been subjected to defect management. This information also includes information regarding the spare area 107. The disc definition structure 111 is located at a physically specific position in the first defect management area 104. The disc definition structure 111 has a prescribed size.

In the unused area 113, currently meaningless information is recorded. Generally, padding data 127 (for example, 0) is recorded in the unused area 113. When a new defect area is detected in the user area 106, a defect entry for managing the new defect area is added to the defect list 112. As a result, the size of the unused area 113 is decreased by the size of the added defect entry.

The defect list 112 includes a header 121, a first defect entry 122, a second defect entry 123, . . . , an (N–1)th defect entry 124, an Nth entry 125, and an anchor 126. The header 121, the first through Nth entries 122 through 125, and the anchor 126 are located in this order in the defect list 112.

In the first example, it is assumed that the total of the size of the defect list 112 and the size of the unused area 113 is 4ECC. The total size is not limited to 4ECC and is arbitrary.

The header 121 includes a defect list identifier 131 which represents that the area is the defect list 112, a defect entry number 132 which represents the number of entries included in the defect list 112, and first update times information 133 which represents the number of times which an updated defect list has been recorded in the first defect management area 104. In FIG. 1, the defect entry number 132 is N (N is an integer satisfying $N \geq 0$), and the content of the first update times information 133 is M (M is an integer satisfying $M \geq 0$). The defect list identifier 131 may be located, for example, at the start of the header 121 as shown in FIG. 1.

The header 121 is located at a physically specified position. In the first example, the header 121 is located at the start of the defect list 112. The position of the header 121 in the defect list 112 is arbitrary as long as the header 121, the first through Nth defect entries 122 through 125, and the anchor 126 are located in this order in the defect list 112.

In the case of the optical disc 100 shown in FIG. 1, the defect entry number 132 is N. Thus, the defect list 112 includes the first defect entry 122, . . . , and the Nth defect entry 125. The first defect entry 122 includes first defect position information 141 which is position information showing the position of a defect area, and first substitute position information 142 which is position information showing the position of a part of the spare area 107 which is usable instead of the defect area. Likewise, the second defect entry 123 includes second defect position information and second substitute position information. The (N−1)th defect entry 124 and the Nth defect entry 125 also have substantially the same structure. Here, each of the first defect position information 141 and the first substitute position information 142 is generally a sector number.

The defect entries are generally located such that the defect position information included therein is in an ascending order. More specifically, when, for example, the defect position information is a sector number, defect position information having the smaller sector number is located in the first defect entry 122 as the first defect position information 141. After this, the defect entries are located in the order of the sector numbers. Defect position information having the larger sector number is located in the Nth defect entry 125 as Nth defect position information.

The defect entries in the defect list 112 do not need to be located in an ascending order. For example, the defect entries may be located such that the sector numbers are in a descending order. Alternatively, the defect entries may be located randomly.

The anchor 126 includes an anchor identifier 151 for identifying that the area is an anchor of the defect list 112, second update times information 152 which represents the number of times which the updated defect list has been recorded in the first defect management area 104, and reserve information 153 for future expansion. In FIG. 1, the content of the second update times information 152 is M (M is an integer satisfying M≧0), and is the same as that of the first update times information 133. As long as the first defect management area 104 is updated normally, the content of the first update times information 133 and the content of the second update times information 152 are identical to each other. The anchor identifier 151 may be located, for example, at the start of the anchor 126 as shown in FIG. 1.

In this specification, the first and second update times information 133 and 152 represent the number of times which the updated defect list has been recorded in the first defect management area 104 (i.e., the number of times which the defect list 112 has been updated and recorded on the optical disc 100). The first and second update times information 133 and 152 may represent the number of times which the defect list has been updated (i.e., the number of times which the defect list has been updated in the storage section described below). In the following description, the first and second update times information 133 and 152 represent the number of times which the updated defect list has been recorded in the first defect management area 104.

The anchor 126 is located subsequently to the Nth defect entry 125. It should be noted that since the size of the defect list 112 is variable, the position at which the anchor 126 is located is also variable.

Next, the header 121, the first defect entry 122, the anchor 126 and the unused area 113 will be described in detail.

FIGS. 2A through 2D respectively show detailed data structures of the header 121, the first defect entry 122, the anchor 126 and the unused area 113.

In FIGS. 2A through 2D, "BP" represents the bit position, and "Val" represents the binary value corresponding to each BP. In the example shown in FIGS. 2A through 2D, the size of each of the header 121, the first defect entry 122, the anchor 126 and the unused area 113 is 8 bytes (bit position 0 through bit position 63).

FIG. 2A shows an exemplary detailed structure of the header 121. In this example, Val for only the bit position 62 of the defect list identifier 131 is 1 (Val=1); i.e., 0x4000 in hexadecimal representation.

FIG. 2B shows an exemplary detailed structure of the first defect entry 122. It is assumed that the maximum number of the sector among the sectors usable in the data area 102 is 0x07FFFFFF in hexadecimal representation. The maximum value which has a possibility of being registered as the first defect position information 141 in the first defect entry 122 is 0x07FFFFFF in hexadecimal representation as shown in FIG. 2B.

FIG. 2C shows an exemplary detailed structure of the anchor 126. In this example, Val for all the bit positions 59 through 63 in the anchor identifier 151 is 1 (Val=1); i.e., 0xFFFF in hexadecimal representation.

FIG. 2D shows an exemplary detailed structure of the unused area 113. In the unused area 113, the padding data 127 is generally recorded. In the unused area 113, Val=0. In FIG. 2D, 0 is recorded as the padding data, but the padding data is not limited to 0.

For the defect list identifier 131 and the anchor identifier 151, a value which is distinguishable from any other defect entry and that of the unused area 113 is adopted. As shown in FIG. 2C, Val=1 is set for at least one of the bit positions 59 through 63 which are never 1 in any defect entry or the unused area 113.

Similarly, as shown in FIG. 2A, Val=1 is set for at least one of the bit positions 59 through 63 which are never 1 in any defect entry or the unused area 113, such that the value sequence of the bit positions 59 through 63 in the defect list identifier 131 is different from that of the bit positions 59 through 63 in the anchor identifier 151.

Owing to such settings, the anchor identifier 151 is distinguishable from the defect list identifier 131, any defect entry, and the unused area 113. The defect list identifier 131 is also distinguishable from the anchor identifier 151, any defect entry, and the unused area 113.

The values for the defect list identifier 131 and the anchor identifier 151 in FIGS. 2A and 2C are mere examples, and the values are not limited to these.

In the first example, the defect list identifier 131 and the anchor identifier 151 are distinguished from any defect entry and the unused area 113 and further the defect list identifier 131 and the anchor identifier 151 are distinguishable from each other as described above. Therefore, even when any defect entry is read as the anchor identifier 151 in the anchor 126, that defect entry is never erroneously determined as the anchor identifier 151. Accordingly, it can be easily determined whether or not the defect list 112 has been updated normally.

Since it is not necessary to provide a header for each 1ECC size, the processing efficiency of updating the defect list is improved. Since the header is not interposed between two defect entries, defect entries can be easily searched for, added, and deleted.

The following description will be made with the premise that the optical disc 100 has the data structure shown in FIG. 1.

(2) Reproduction/Recording (Update)

Figure 3:
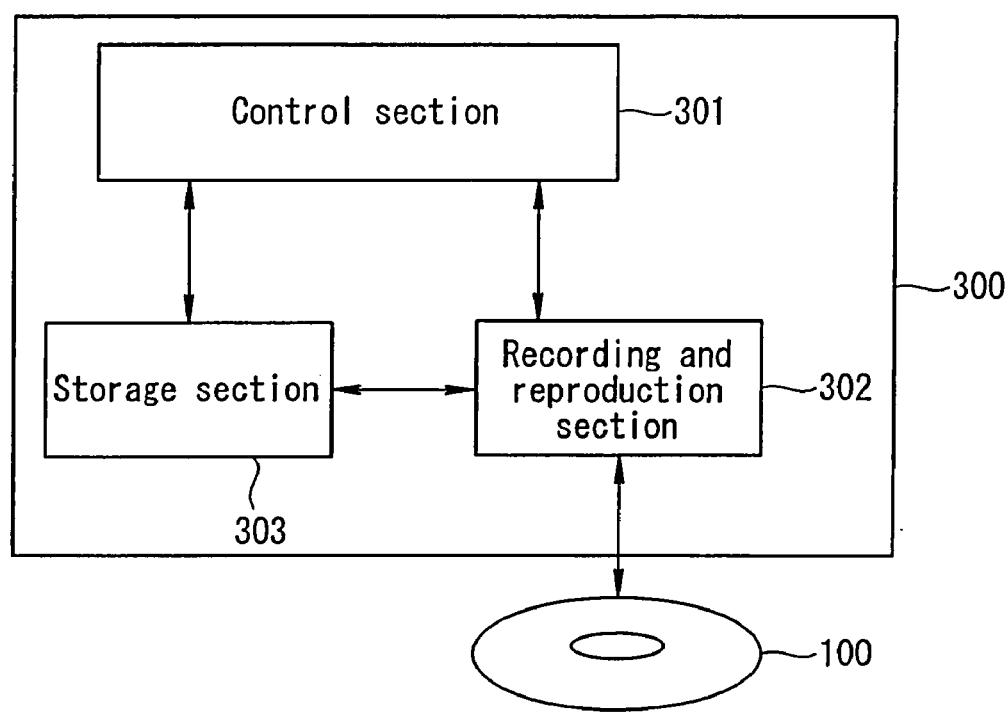
FIG. 3 is a block diagram of a recording and reproduction apparatus 300 according to a first example of the present invention.

FIG. 3 is a block diagram of a recording and reproduction apparatus 300 according to the first example. The recording and reproduction apparatus 300 records information on the optical disc 100 and/or reproduces information recorded on the optical disc 100.

The recording and reproduction apparatus 300 includes a control section 301, a recording and reproduction section 302, and a storage section 303.

The control section 301 controls the operation of the recording and reproduction section 302. The control section 301 may be, for example, a CPU. The control section 301 has an inherent defect list identifier for identifying the defect list 112 of the optical disc 100 and an inherent anchor identifier for identifying the anchor 126 of the defect list 112 of the optical disc 100, which are stored initially. The contents (values) of the inherent defect list identifier and the inherent anchor identifier are correct and are not rewritable. The control section 301 uses the recording and reproduction section 302 and the storage section 303 to control the execution of the following processing: (a) defect management processing for specifying the latest defect list among the defect lists which are recorded in the first through fourth defect management areas 104, 105, 108 and 109; and (b) defect management processing for updating the defect lists which are recorded in the first through fourth defect management areas 104, 105, 108 and 109 into the latest defect list.

The recording and reproduction section 302 records information on the optical disc 100 and/or reproduces the information recorded on the optical disc 100. Such recording/reproduction is performed by, for example, emitting laser so as to write the information on the optical disc 100 as a signal and/or so as to read the information written as a signal on the optical disc 100.

The storage section 303 stores information to be recorded on the optical disc 100 and/or stores information which has been reproduced from the optical disc 100. The storage section 303 may be, for example, a random access memory (RAM). Owing to the operation of the control section 301, the storage section 303 includes a defect list area saved for storing the defect list 112 reproduced from a defect management area (for example, the first defect management area 104) of the optical disc 100 or a latest defect list to be recorded in the defect management area.

(2-1) Defect Management Processing for Specifying the Latest Defect List

Next, the operation of defect management processing for specifying the latest defect list performed by the recording and reproduction apparatus 300 will be described.

The control section 301 executes the defect management processing. The control section 301 follows the procedure of the defect management processing to request the recording and reproduction section 302 to reproduce the information of the disc definition structure 111 located at the start of the first defect management area 104 and store the reproduced information from the disc definition structure 111 in the storage section 303.

Upon the request from the control section 301, the recording and reproduction section 302 reproduces the information of the disc definition structure 111 from the optical disc 100 and stores the information in the storage section 303. The recording and reproduction section 302 reports to the control section 301 that the reproduction and storage of the information of the disc definition structure 111 has been completed.

Upon receiving the report from the recording and reproduction section 302, the control section 301 checks whether or not the optical disc 100 has been subjected to defect management, based on the information of the disc definition structure 111 stored in the storage section 303.

When confirming that the optical disc 100 has been subjected to defect management, the control section 301 requests the recording and reproduction section 302 to reproduce the header 121 located at a fixed position of the defect list 112 (in the example of FIG. 1, at the start of the defect list 112) recorded in the first defect management area 104 and to store the reproduced header 121 in the storage section 303.

Upon the request from the control section 301, the recording and reproduction section 302 reproduces the header 121 located at the start of the defect list 112 recorded in the first defect management area 104 and store the reproduced header 121 in the storage section 303. The recording and reproduction section 302 reports to the control section 301 that the reproduction and storage of the header 121 has been completed.

Upon receiving the report from the recording and reproduction section 302, the control section 301 compares the content of the inherent defect list identifier initially stored in the control section 301 with the content of the defect list identifier 131 included in the header 121 stored in the storage section 303 to check whether or not the stored information is the header 121 in the defect list 112.

When the two contents compared match each other, the control section 301 determines that the stored information is the header 121 in the defect list 112 and proceeds with the defect management processing. When the two contents compared do not match each other, the control section 301 determines that updating of the first defect management area 104 failed (abnormal defect management area) and terminates the defect management processing. The two contents compared do not match each other when, for example, there is a defect area in the first defect management area 104 and thus information cannot be read therefrom.

In order to identify the anchor 126 in the defect list 112 recorded in the first defect management area 104, the control section 301 uses the defect entry number 132 included in the header 121 stored in the storage section 303 to calculate the position of the start of the anchor 126 in the defect list 112. The position of the start of the anchor 126 can be obtained by multiplying the defect entry number 132 by the size of one defect entry which is a fixed value.

The control section 301 requests the recording and reproduction section 302 to reproduce the anchor 126 in the defect list 112 based on the calculated position, and store the reproduced information in the storage section 303.

Upon the request from the control section 301, the recording and reproduction section 302 reproduces the information present at the designated position in the defect list 112 and stores the reproduced information in the storage section 303. The recording and reproduction section 302 reports to the control section 301 that the reproduction and storage of the information present at the designated position has been completed.

Upon receipt of the report from the recording and reproduction section 302, the control section 301 compares the content of the inherent anchor identifier initially stored in the control section 301 with the content of the information located at the start of the entire information stored in the storage section 303 to check whether or not the stored information is the anchor 126 in the defect list 112. The "information located at the start of the entire information stored in the storage section 303" is the information expected to be the anchor identifier 151 included in the anchor 126.

When the two contents compared match each other, the control section 301 determines that the stored information is the anchor 126 in the defect list 112 and proceeds with the defect management processing. When the two contents compared do not match each other, the control section 301 determines that updating of the first defect management area 104 failed (abnormal defect management area) and terminates the defect management processing. The two contents compared do not match each other when, for example, the information present at the position calculated using the defect entry number 132 is not the anchor 126. More specifically, the two contents compared do not match each other when, for example, the recording and reproduction apparatus 300 is turned off while the first through Nth defect entries 122 through 125 in the defect list 112 are being updated. In this case, the defect entry number 132 included in the header 121 does not match the total number of the first through Nth defect entries 122 through 125.

The control section 301 compares the content of the first update times information 133 included in the header 121 with the second update times information 152 included in the anchor 126 stored in the storage section 303.

When the two contents compared match each other, the control section 301 determines that the first defect management area 104 has been updated normally, and proceeds with the defect management processing.

When the two contents compared do not match each other, the control section 301 determines that updating of the first defect management area 104 failed (abnormal defect management area) and terminates the defect management processing. The two contents compared do not match each other when, for example, the recording and reproduction apparatus 300 is turned off while the first through Nth defect entries 122 through 125 in the defect list 112 are being updated and therefore updating of the defect entries 122 through 125 is not completed. In this case, the content of the first update times information 133 included in the header 121 does not match the content of the second update times information 152 included in the anchor 126.

The control section 301 performs substantially the same processing for each of the second defect management area 105, the third defect management area 108 and the fourth defect management area 109.

After checking whether or not each of the first through fourth defect management areas 104, 105, 108 and 109 is a normal defect management area, the control section 301 specifies the latest defect management area among the defect management areas which have been determined to be normal, as follows. The control section 301 makes a comparison of the first update times information 133 recorded in the defect management areas which have been determined to be normal, and specifies the defect management area having the largest number of updates as the latest defect management area. The defect list recorded in the specified latest defect management area is specified as the latest defect list.

For specifying the latest defect management area, the second update times information 152 included in the anchor 126 may be used instead of the first update times information 133.

The control section 301 requests the recording and reproduction section 302 to reproduce the defect list recorded in the specified latest defect management area and store the reproduced defect list in the defect list area saved in the storage section 303.

Upon the request from the control section 301, the recording and reproduction section 302 reproduces the defect list recorded in the specified latest defect management area and stores the reproduced defect list in the defect list area in the storage section 303. The recording and reproduction section 302 reports to the control section 301 that the reproduction and storage of the defect list has been completed.

Thus, the operation of defect management processing for specifying the latest defect list performed by the recording and reproduction apparatus 300 is completed.

Using the specified latest defect list, the user data recorded in the data area 102, for example, can be reproduced. In this case, the control section 301 requests the recording and reproduction section 302 to reproduce the user data based on the latest defect list and store the reproduced user data in the storage section 303.

Upon the request from the control section 301, the recording and reproduction section 302 reproduces the user data from the data area 102 and stores the reproduced user data in the storage section 303.

Information recording may be performed using the specified latest defect list.

Figure 4:
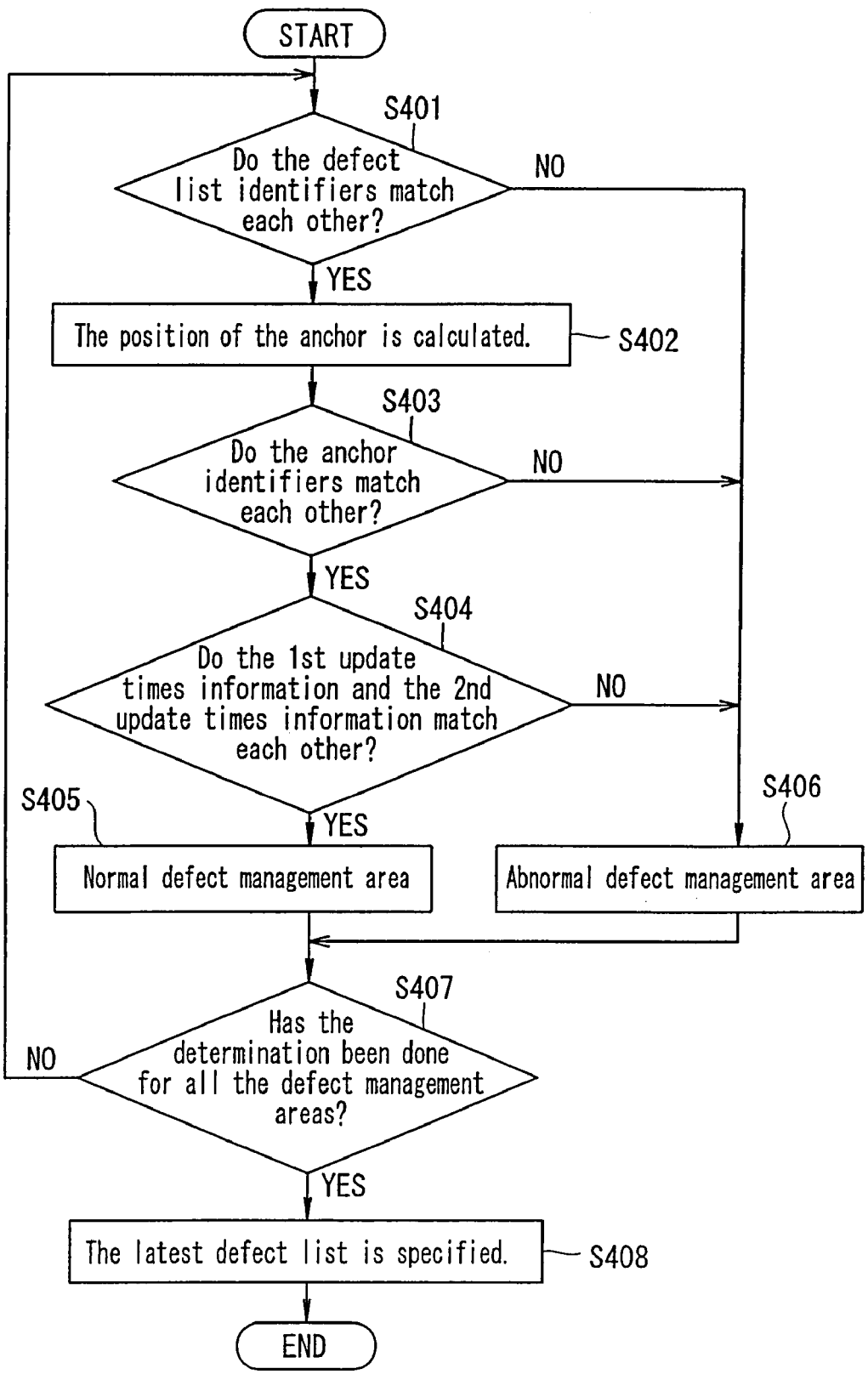
FIG. 4 is a flowchart illustrating a procedure of defect management processing for specifying the latest defect list in the first example.

FIG. 4 shows a procedure of defect management processing for specifying the latest defect list in the first example. The defect management processing is executed by the control section 301. Hereinafter, each step of the procedure of defect management processing will be described. The procedure of defect management processing is started after it is confirmed that the optical disc 100 has been subjected to defect management. Whether or not the optical disc 100 has been subjected to defect management is determined based on the disc definition structure 111 in the optical disc 100.

Step S401: The defect list identifier 131, the defect entry number 132 and the first update times information 133 included in the header 121 are reproduced. The content of the reproduced defect list identifier 131 is compared with the content of the inherent defect list identifier. The inherent defect list identifier identifies the defect list 112 in the optical disc 100. The inherent defect list identifier has a correct value which is not rewritable. The inherent defect list identifier may be initially stored in the control section 301. When the two contents compared match each other, the defect management processing advances to step S402. When the two contents compared do not match each other, the defect management processing advances to step S406.

Step S402: When the content of the defect list identifier 131 and the content of the inherent defect list identifier are determined to match each other in step S401, the reproduced information is determined to be the header 121 in the defect list 112. Using the defect entry number 132 included in the header 121, the position of the start of the anchor 126 in the defect list 112 is calculated. The position of the start of the anchor 126 is obtained by multiplying the defect entry number 132 by the size of one defect entry which is a fixed value. The defect management processing advances to step S403.

Step S403: Based on the position obtained in step S402, information expected to be the anchor identifier 151 and the second update times information 152 included in the anchor 126 are reproduced. The content of the information expected to be the anchor identifier 151 is compared with the content of the inherent anchor identifier. The inherent anchor identifier identifies the anchor of the defect list 112. The inherent anchor identifier has a correct value which is not rewritable. The inherent anchor identifier is initially stored in the control section 301. When the two contents compared are determined to match each other, the defect management processing advances to step S404. When the two contents compared are determined not to match each other, the defect management processing advances to step S406.

Step S404: When the content of the information expected to be the anchor identifier 151 and the content of the inherent anchor identifier are determined to match each other in step S403, the stored information is determined to be the anchor 126 in the defect list 112. The content of the first update times information 133 included in the header 121 is compared with the content of the second update times information 152 included in the anchor 126. When the two contents compared are determined to match each other, the defect management processing advances to step S405. When the two contents compared are determined not to match each other, the defect management processing advances to step S406.

Step S405: When the content of the first update times information 133 and the content of the second update times information 152 are determined to match each other in step S404, the first defect management area 104 is determined to have been updated normally. Then, the defect management processing advances to step S407.

Step S406: When the contents compared are determined not to match each other in steps S401, S403 or S404, updating of the first defect management area 104 is determined to have failed (abnormal defect management area), and the defect management processing for the first defect management area 104 is terminated. The defect management processing advances to step S407.

Step S407: It is determined whether or not the operations in steps S401 through S406 have been performed for all the defect management areas in the optical disc 100. When the operations in steps S401 through S406 have not been performed for all the defect management areas, the defect management processing returns to step S401. When the operations in steps S401 through S406 have been performed for all the defect management areas, the defect management processing advances to step S408.

Step S408: The latest defect list is specified. More specifically, the latest defect management area among the defect management areas determined to be normal is specified, as follows. A comparison is made of the first update times information (or the second update times information) recorded in the defect management areas determined to be normal, and the defect management area having the largest number of updates is specified as the latest defect management area. The defect list recorded in the specified latest defect management area is specified as the latest defect list.

When the latest defect list of the optical disc 100 is specified by steps S401 through S408, the defect management processing is completed. Using the latest defect list obtained in step S408, the user data recorded in the data area 102, for example, can be reproduced.

(2-2) Defect Management Processing for Updating the Latest Defect List

Returning to FIG. 3, the operation of defect management processing for updating the latest defect list performed by the recording and reproduction apparatus 300 will be described. In the following example, the defect list is updated when another defect area is detected while the user data is being recorded in the data area 102 of the optical disc 100, or when a portion of the user area 106 which was previously determined to be a defect area is determined to be a normal defect area while the user data recorded in the data area 102 is being reproduced. Throughout this specification, a "normal defect area" is defined to mean an area which was previously determined to be a defect area but currently has no defect and allows information to be recorded therein and/or allows information therein to be reproduced. An area which was previously determined to be a defect area is currently determined to be a normal defect area when, for example, the defect is caused by dust or stain such as a fingerprint on the surface of the optical disc. In this case, when the user cleans the surface of the optical disc to remove the dust or stain, the area in which the dust or stain existed (i.e., the area which was previously determined to be a defect area) is currently determined to be a normal area usable for recording/reproduction.

The storage section 303 stores the latest defect list. The latest defect list may be located in the defect list area in the storage section 303. The latest defect list includes the latest header, P number of latest defect entries (P is an integer satisfying P≧0 where P=N or P≠N), and the latest anchor. In the first example, the latest header, the P number of latest defect entries, and the latest anchor are located in the latest defect list in this order. The latest header is located at a fixed position in the latest defect list. The latest anchor is located subsequently to the Pth latest defect entry among the P number of latest defect entries. The latest header includes the latest defect list identifier, the first latest update times information and the latest defect entry number P. The content of the latest defect list identifier is always the same as that of the inherent defect list identifier stored in the control section 301. The latest anchor includes the latest anchor identifier and the second latest update times information which has the same content as that of the first latest update times information. The content of the latest anchor identifier is always the same as that of the inherent anchor list identifier stored in the control section 301. It is assumed that the P number of latest defect entries are arranged in an ascending order of the defect position information (defect sector numbers). The latest defect list may include an unused area. It is not always necessary that the latest header includes the latest defect list identifier. Similarly, it is not always necessary that the latest anchor includes the latest anchor identifier.

The above-described arrangement of the latest header and the P number of latest defect entries and the latest anchor is merely an example. The arrangement of the latest header and the P number of latest defect entries and the latest anchor in the latest defect list is arbitrary.

The control section 301 executes the defect management processing. The control section 301 requests the recording and reproduction section 302 to determine whether (a) another defect area exists in the data area 102, (b) a defect area which was previously determined to be a defect area is currently a normal defect area, or (c) neither (a) nor (b) is the case. Whether or not another defect area exists in the data area 102 is determined by, for example, comparing a signal obtained by reproducing data immediately after user data is recorded with a signal representing user data to be recorded. When these signals match each other, the user data is determined to have been normally recorded in the data area 102. When these signals do not match each other, it is determined that the user data has not been normally recorded in the data area 102 and another defect area exists in the data area 102.

When determining that another defect area exists in the data area 102 or that the area which was previously determined to be a defect area is currently a normal defect area, the control section 301 updates the latest defect list stored in the storage section 303.

Specific procedures of updating the latest defect list will be described. There are three cases of updating the latest defect list, namely, (i) addition of a defect entry, (ii) deletion of a defect entry; and (iii) change of a defect entry. Each of these cases will be described one by one.

(i) Addition of a Defect Entry

When it is determined that another defect area exists in the user area 106, a defect entry including the position information on the position of the another defect area is added to the latest defect list. Based on the defect position information on the detected defect area, the control section 301 determines the position of the defect entry to be added. The control section 301 shifts the other defect entries and the latest anchor existing subsequent to the determined position toward the unused area, and adds the defect entry including the position information on the another defect area at the determined position. As a result, the P number of latest defect entries are updated to P' number of latest defect entries (P≠P', P<P').

Following the addition of the defect entry, the control section 301 updates the latest defect entry number from P into P'. In this case, the latest defect entry number is increased by the number of the added defect entries (i.e., by the number of the detected defect sectors).

After the P number of latest defect entries and the latest defect entry number P are updated, the control section 301 increments, by one, the content of the first latest update times information included in the latest header and the content of the second latest update times information included in the latest anchor.

(ii) Deletion of a Defect Entry

When an area which was previously determined to be a defect area is currently determined to be a normal defect area, the control section 301 deletes the defect entry including the position information on the area determined to be the normal defect area. The control section 301 then shifts the defect entries located subsequent to the deleted defect entry and the latest anchor toward the latest header by the size of the deleted defect entry. The unused area is expanded by the size of the deleted defect entry, and the control section 301 records padding data (for example, 0) in the expanded portion of the unused area. As a result, the P number of latest defect entries are updated to P' number of latest defect entries (P≠P', P>P').

Following the deletion of the defect entry, the control section 301 updates the latest defect entry number from P into P'. In this case, the latest defect entry number is decreased by the number of the deleted defect entries (i.e., by the number of the defect sectors determined to be normal).

After the P number of latest defect entries and the latest defect entry number P are updated, the control section 301 increments, by one, the content of the first latest update times information included in the latest header and the content of the second latest update times information included in the latest anchor.

(iii) Change of a Defect Entry

When another defect area is determined to exist in the spare area 107, the control section 301 rewrites the substitute position information corresponding to the another defect area in the latest defect list. The substitute position information corresponding to the another defect area is rewritten into substitute position information representing a portion other than the another defect area in the spare area 107.

The control section 301 changes the latest defect entry number from P to P' (P=P' since no defect entry is added to or deleted from the latest defect list). Although the number of the latest defect entries remains the same, the substitute position information included is different. Throughout this specification, "updating of a defect list" encompasses the case of not changing the number of defect entries included in the defect list in addition to the case of changing the number of defect entries included in the defect list.

After the P number of latest defect entries and the latest defect entry number P are updated, the control section 301 increments, by one, the content of the first latest update times information included in the latest header and the content of the second latest update times information included in the latest anchor.

The operations (i) through (iii) are performed by the control section 301 for the latest defect list stored in the storage section 303. In the case where the first and second update times information 133 and 152 represent the number of times which the updated latest defect list has been recorded in the first defect management area 104, the first and second latest update times information may each be incremented by one only once before the updated latest defect list is recorded in the first defect management area 104. By contrast, in the case where the first and second update times information 133 and 152 represent the number of times which the latest defect list has been updated in the storage section 303, the first and second latest update times information may be incremented by one each time the latest defect entries and the latest defect entry number are updated.

The control section 301 requests the recording and reproduction section 302 to record the latest defect list updated in the storage section 303 in the first defect management area 104 of the optical disc 100. For example, the control section 301 requests the recording and reproduction section 302 to record the updated latest header, the updated P' number of latest defect entries, and the updated latest anchor in the first defect management area 104 in this order.

Upon the request from the control section 301, the recording and reproduction section 302 records the updated latest defect list in the first defect management area 104. The updated defect list replacing the defect list 112 is recorded in the first defect management area 104 in the order of the latest header replacing the header 121, the latest defect entries replacing the first through Nth defect entries 122 through 125, and the latest anchor replacing the anchor 126. The recording and reproduction section 302 reports to the control section 301 that the recording of the updated latest defect list in the first defect management area 104 has been completed.

The control section 301 requests the recording and reproduction section 302 to record the latest defect list updated in the storage section 303 in each of the second through fourth defect management areas 105, 108 and 109. More specifically, again, the control section 301 requests the recording and reproduction section 302 to record the updated latest header, the updated latest defect entries, and the updated latest anchor in this order in the second through fourth defect management areas 105, 108 and 109.

Upon the request from the control section 301, the recording and reproduction section 302 records the updated latest defect list in each of the second through fourth defect management areas 105, 108 and 109.

Thus, the operation of defect management processing for updating the latest defect list performed by the recording and reproduction apparatus 300 is completed.

The order of recording the updated latest defect list is not limited to the above-described order of the latest header, the P' number of latest defect entries, and the latest anchor. As long as the header 121, the N number of defect entries 122 through 125, and the anchor 126 are located in this order in the defect list 112, the control section 301 may request the recording and reproduction section 302 to record the updated latest anchor, the updated P' number of latest defect entries, and the updated latest header in this order in each of the first through fourth defect management areas 104, 105, 108 and 109, and the recording and reproduction section 302 may record the updated latest defect list in each of the first through fourth defect management areas 104, 105, 108 and 109 upon the request from the control section 301.

FIG. 5 shows a procedure of defect management processing for updating the latest defect list in the first example. The defect management processing is executed by the control section 301. Hereinafter, each step of the procedure of defect management processing will be described.

Step S501: It is determined whether (a) another defect area exists in the data area 102, (b) a defect area which was previously determined to be a defect area is currently a normal defect area, or (c) neither (a) nor (b) is the case. When it is determined that (a) another defect area exists in the data area 102 or that (b) the defect area is currently a normal defect area, the defect management processing advances to step S502. When it is determined that neither (a) nor (b) is the case, the defect management processing is terminated. Such a determination is, for example, performed when recording user data in the data area 102 or reproducing user data recorded in the data area 102.

Step S502: The latest defect entries and the latest defect entry number P are updated. The P number of latest defect entries are updated to P' number of latest defect entries. The latest defect entry number P is updated to P'.

More specifically, when another defect area is determined to exist in the user area 106, another defect entry is added to the latest defect list. Next, the latest defect entry number is increased by the number of the added defect entries (P≠P', P<P').

When another defect is determined to exist in the spare area 107, the substitute position information corresponding to the another defect area in the latest defect list is rewritten. The substitute position information corresponding to the another defect area is rewritten into substitute position information representing a portion other than the another defect area in the spare area 107. The latest defect entry number is not changed (P=P').

When an area which was previously determined to be a defect area is currently determined to be a normal defect area, the defect entry including the position information on the position of the defect area which was previously determined to be a defect area is deleted. Next, the latest defect entry number is decreased by the number of the deleted defect entries (i.e., the number of defect areas (number of sectors) currently determined to be normal) (P≠P', P>P').

When the latest defect entries and the latest defect entry number P are updated, the defect management processing advances to step S503.

Step S503: The first and second latest update times information are each incremented by one. Then, the defect management processing advances to step S504.

Step S504: The latest defect list updated in steps S502 and S503 is recorded in the first defect management area 104 of the optical disc 100. For example, the updated latest header, the updated P' number of latest defect entries, and the updated latest anchor are recorded in the first defect management area 104 in this order. Then, the defect management processing advances to step S505. As long as the header 121, the N number of defect entries 122 through 125, and the anchor 126 are located in this order in the defect list 112, the updated latest anchor, the updated P' number of latest defect entries, and the updated latest header may be recorded in this order in the first defect management area 104.

Step S505: It is determined whether or not the updated defect list has been recorded in all the defect management areas of the optical disc 100 (in this case, the first through fourth defect management areas 104, 105, 108 and 109). When the updated defect list has been recorded in all the defect management areas of the optical disc 100, the defect management processing is terminated. When the updated defect list has not been recorded in all the defect management areas of the optical disc 100, the defect management processing returns to step S504.

As described above, the arrangement of the latest header, the P' number of latest defect entries and the latest anchor in the latest defect list is arbitrary. The updated latest defect list is recorded in each of the first through fourth defect management areas 104, 105, 108 and 109 of the optical disc 100 as follows. Such that the updated latest header is located at the position of the header 121, the updated P' number of latest defect entries are located at the positions of the defect entries 122 through 125, and the updated latest anchor is located at the position of the anchor 126, the updated latest defect list is recorded in each of the first through fourth defect management areas 104, 105, 108 and 109 in the order of the updated latest header, the updated P' number of latest defect entries, and the updated latest anchor or in the order of the updated latest anchor, the updated P' number of latest defect entries, and the updated latest header.

In the above description, the updated latest defect list is recorded on the optical disc 100 shown in FIG. 1 where the optical disc 100 has been subjected to defect management. Next, recording of the updated latest defect list on an optical disc in an initial state immediately after being shipped from the plant will be described.

An optical disc in an initial state is assumed to have the same structure as that shown in FIG. 1 except that, for example, the defect list 112 (FIG. 1) has no information. In such optical disc, neither a defect list identifier for identifying the defect list nor an anchor identifier for identifying the anchor of the defect list is recorded. Therefore, in the case where the latest defect list includes neither the latest defect list identifier nor the latest anchor identifier, the defect management processing of recording the latest defect list includes the process of recording the defect list identifier and the anchor identifier in addition to the process of recording the latest defect list in the defect management area. In the case where the latest defect list includes the latest defect list identifier and the latest anchor identifier, no detailed explanation will be given since the processing was described above with reference to FIG. 5.

The control section 301 requests the recording and reproduction section 302 to record the latest defect list stored in the storage section 303 in the defect management area of the optical disc and to record the inherent defect list identifier and the inherent anchor identifier, which are initially stored in the control section 301, in a defect management area of the optical disc. More specifically, the inherent defect list identifier is recorded in the defect management area so as to be located at the start of the header 121. The inherent anchor identifier is recorded in the defect management area so as to be located at the start of the anchor 126. In this case, an arbitrary value is recorded as the latest defect entry number and as the latest defect entry of the latest defect list which respectively correspond to the defect entry number 132 and the first through Nth defect entries 122 through 125. As the first update times information and as the second update times information, for example, 0 or 1 is recorded. The values to be recorded as the first and second update times information are arbitrary as long as the values are equal to each other and represent that recording has been performed on an optical disc in the initial state only once.

The method for recording the defect list identifier and the anchor identifier in the defect management area is not limited to the above-described method. For example, the inherent defect list identifier already stored in the control section 301 is given as the latest defect list identifier at the start of the latest header of the latest defect list stored in the storage section 303. Similarly, the inherent anchor identifier already stored in the control section 301 is given as the latest anchor identifier at the start of the latest anchor of the latest defect list. As the defect management processing performed on an optical disc in the initial state, the latest defect list including the latest defect list identifier and the latest anchor identifier obtained in this manner may be recorded in the defect management area.

This process of defect management processing is performed in steps S504 and S505 in FIG. 5.

In the first example, it is accurately determined whether or not the defect management area has been updated normally. This will be described in three different cases of update. In the following explanation, the optical disc 100 is used.

SPECIFIC EXAMPLE 1

When a Defect Entry is Added

FIG. 6 shows data structures of a defect list in various states. Part (a) shows a data structure of a pre-update defect list. Part (b) shows a data structure of a defect list which was updated normally. Part (c) shows a data structure of a defect list which was not updated normally.

FIG. 6 shows the case where another defect area (defect sector) is detected in the user area 106 and one defect entry is added. The addition of the defect entry is performed as described above with reference to FIGS. 3 and 5.

Part (a) of FIG. 6 shows a data structure before the defect list is updated. The defect list shown in part (a) is the same as the defect list 112 shown in FIG. 1. The defect list includes a first defect entry, . . . , and an Nth defect entry. The defect entry number is N, and the content of each of the first update times information and the second update times information is M.

Part (b) of FIG. 6 shows a data structure after the defect list is updated normally (one defect entry is added normally). When one defect entry is added normally to the defect list, the defect list includes the first defect entry, . . . , the Nth defect entry, and an (N+1)th defect entry. The number of defect entries is increased by one from the state in part (a) of FIG. 6. The defect entry number is updated from N to N+1. The content of each of the first update times information and the second update times information is updated from M to M+1.

Following the addition of the defect entry, the position of the anchor is shifted toward the unused area by the size of the added defect entry from the position shown in part (a) of FIG. 6. The shifted position of the anchor is calculated as follows. The defect entry number (N+1) included in the header is multiplied by the size of one defect entry. The shifted position of the anchor is away toward the unused area from the end of the header by the multiplication result. At this point, the information which is read from the calculated position matches the value of the inherent anchor identifier of the control section 301. Thus, it is confirmed that the anchor is read. In addition, the content of the first updated times information matches the content of the second updated times information. Thus, it can be determined that the defect list has been updated normally.

Part (c) of FIG. 6 shows a data structure of a defect data in the case where the update failed before the anchor is recorded. The failure occurs when, for example, the recording and reproduction apparatus 300 is turned off while the defect list is being updated. In part (c) of FIG. 6, the defect list includes the first defect entry, . . . , and the Nth defect entry, like in part (a) of FIG. 6. Although the defect list includes the same defect entries as those of part (a) of FIG. 6, the defect entry number is updated from N to (N+1). The content of the first update times information is updated from M to (M+1). However, the content of the second update times information is M like in part (a) of FIG. 6. In this case, the anchor is not located at the position which is obtained by multiplying the defect entry number (N+1) included in the header by the size of one defect entry. The information which is read from the position calculated as the position of the anchor is padding data (=0 in part (c) of FIG. 6) which is recorded in the unused area and is meaningless information. The information which is read as the position of the anchor is different from the value of the inherent anchor identifier of the control section 301. Thus, it is determined that the updating of the defect list failed.

SPECIFIC EXAMPLE 2

When a Defect Entry is Deleted

FIG. 7 shows data structures of a defect list in various states. Part (a) shows a data structure of a pre-update defect list. Part (b) shows a data structure of a defect list which was updated normally. Part (c) shows a data structure of a defect list which was not updated normally.

FIG. 7 shows the case where a defect area which was previously determined to be a defect area is currently determined to be a normal defect area, and the defect entry including the position information on the position of the defect area which is currently determined to be the normal defect area is deleted. The deletion of the defect entry is performed as described above with reference to FIGS. 3 and 5.

Part (a) of FIG. 7 shows a data structure before the defect list is updated. The defect list shown in part (a) is the same as the defect list 112 shown in FIG. 1.

Part (b) of FIG. 7 shows a data structure after the defect entry is deleted normally. When one defect entry is deleted normally from the defect list, the defect list includes the first defect entry, . . . , and an (N−1)th defect entry. The number of defect entries is decreased by one from the state in part (a) of FIG. 7. The defect entry number is updated from N to N−1. The content of each of the first update times information and the second update times information is updated from M to M+1.

Following the deletion of the defect entry, the position of the anchor is shifted toward the header by the size of the deleted defect entry from the position shown in part (a) of FIG. 7. The shifted position of the anchor is calculated as follows. The defect entry number (N−1) included in the header is multiplied by the size of one defect entry like in Specific example 1. The shifted position of the anchor is away toward the unused area from the end of the header by the multiplication result. At this point, the information which is read from the calculated position matches the value of the inherent anchor identifier of the control section 301. Thus, it is confirmed that the anchor is read. In addition, the content of the first updated times information matches the content of the second updated times information. Thus, it can be determined that the defect list has been updated normally.

Part (c) of FIG. 7 shows a data structure of a defect data in the case where the update failed before the anchor is recorded. The failure occurs when, for example, the recording and reproduction apparatus 300 is turned off while the defect list is being updated. In part (c) of FIG. 7, the defect list includes the first defect entry, . . . , and the Nth defect entry, like in part (a) of FIG. 7. Although the defect list includes the same defect entries as those of part (a) of FIG. 7, the defect entry number is updated from N to (N−1). The content of the first update times information is updated from M to (M+1). However, the content of the second update times information is M like in part (a) of FIG. 7. In this case, the anchor is not located at the position which is obtained by multiplying the defect entry number (N−1) included in the header by the size of one defect entry. The information which is read from the position calculated as the position of the anchor is the Nth defect position information which is included in the Nth defect entry. The value of the inherent anchor identifier of the control section 301 is different from any of the defect list identifier, the defect entries, or the padding data as described above with reference to FIGS. 2A through 2D. Thus, it never occurs that the content of the Nth defect position information accidentally matches the value of the inherent anchor identifier, resulting in an erroneous determination that the defect list has been updated normally.

SPECIFIC EXAMPLE 3

When a Defect Entry is Changed

FIG. 8 shows data structures of a defect list in various states. Part (a) shows a data structure of a pre-update defect list. Part (b) shows a data structure of a defect list which was updated normally. Part (c) shows a data structure of a defect list which was not updated normally.

FIG. 8 shows the case where another defect area exists in the spare area 107 which is used as the substitute area (substitute sector) for the defect area (defect sector) represented by the (N−1)th defect position information, and the substitute position information in the (N−1)th defect entry is changed. The change of the defect entry is performed as described above with reference to FIGS. 3 and 5.

Part (a) of FIG. 8 shows a data structure before the defect list is updated. The defect list shown in part (a) is the same as the defect list 112 shown in FIG. 1.

Part (b) of FIG. 8 shows a data structure after the defect list is changed normally (after the substitute position information is changed normally). Since no defect entry is added or deleted, the defect list includes the first defect entry, . . . , and the Nth defect entry like in part (a) of FIG. 8. The number of defect entries is N like in part (a) of FIG. 8. The content of each of the first update times information and the second update times information is updated from M to M+1.

Accordingly, the position of the anchor after the update is the same as the position of the anchor before the update. The position of the anchor is calculated as follows. The defect entry number N included in the header is multiplied by the size of one defect entry. The position of the anchor is away toward the unused area from the end of the header by the multiplication result. At this point, the information which is read from the calculated position matches the value of the inherent anchor identifier of the control section 301. Thus, it is confirmed that the anchor is read. In addition, the content of the first updated times information matches the content of the second updated times information. Thus, it can be determined that the defect list has been updated normally.

Part (c) of FIG. 8 shows a data structure of a defect data in the case where the update failed before the anchor is recorded. The failure occurs when, for example, the recording and reproduction apparatus 300 is turned off while the defect list is being updated. In part (c) of FIG. 8, the defect list includes the first defect entry, . . . , and the Nth defect entry, like in part (a) of FIG. 8. The defect entry number is N like in part (a) of FIG. 8. The content of the first update times information is updated from M to (M+1). However, the content of the second update times information is M like in part (a) of FIG. 8. In this case, the position which is obtained by multiplying the defect entry number N included in the header by the size of one defect entry is the correct position of the anchor. However, since the content of the first update times information is different from the content of the second update times information, it never occurs that the defect list is erroneously determined to have been updated normally.

In the first example, the header 121 includes the defect list identifier 131. The header 121 is located at a physically specified position in the optical disc 100 and therefore does not need to include the defect list identifier 131. Even without the defect list identifier 131, the same effect as described in the first example can be provided.

As described above, according to the first example of the present invention, the information recording medium 100 includes the data area 102 for recording user data, and the defect management areas 104, 105, 108 and 109 for recording a defect list used for managing N number of defect areas existing in the data area 102 (N is an integer satisfying N≧0). The defect list 112 includes the header 121, the N number of defect entries respectively including the position information on the positions of the N number of defect areas, and the anchor 126. The header 121, the N number of defect areas, and the anchor 126 are located in this order in the defect list 112.

Owing to such a structure, the size of the defect list 112 is variable. Since the size of the defect list 112 is varied in accordance with the number of detected defect areas (defect sectors), the size of the defect list 112 is decreased when the number of the defect areas is small. Namely, the defect list 112 is accommodated in a small ECC size (e.g., 1ECC size). When the size of the defect list 112 is small, the time required for recording the defect list 112 in the defect management area is shorter and the processing efficiency is improved. Even when a defect area exists in the remaining ECC blocks (unused area) of the defect management area other than the defect list 112, that defect management area can be processed as a normal defect management area. Accordingly, data in the defect management area can be normally reproduced.

According to the first example of the present invention, the header 121 includes the defect list identifier 131 for identifying the defect list 112, the first update times information 133 representing the number of times which the defect list 112 has been updated, and the defect entry number 132 representing the number of defect entries. The anchor 126 includes the anchor identifier 151 for identifying the anchor of the defect list 112, and the second update times information 152 representing the number of times which the defect list 112 has been updated.

Owing to such a structure, it is not necessary to provide a header for each 1ECC size even when the size of the defect list 112 is not accommodated in 1ECC size. Thus, the processing efficiency of updating the defect list 112 is improved. Since the header is not interposed between the two defect entries, defect entries can be, for example, searched for, added and deleted easily.

The content of the anchor identifier 151 is different from any of the defect list identifier 131, the defect entry number 132, the first update times information 133, the defect entries, or the second update times information 152. As such, even when a defect entry is deleted, the information which is erroneously read as the anchor identifier 151 never matches the content of the inherent anchor identifier. Therefore, the defect list 112 is not erroneously determined to have been updated normally when it has not been updated normally.

EXAMPLE 2

(1) Information Recording Medium

Figure 9:
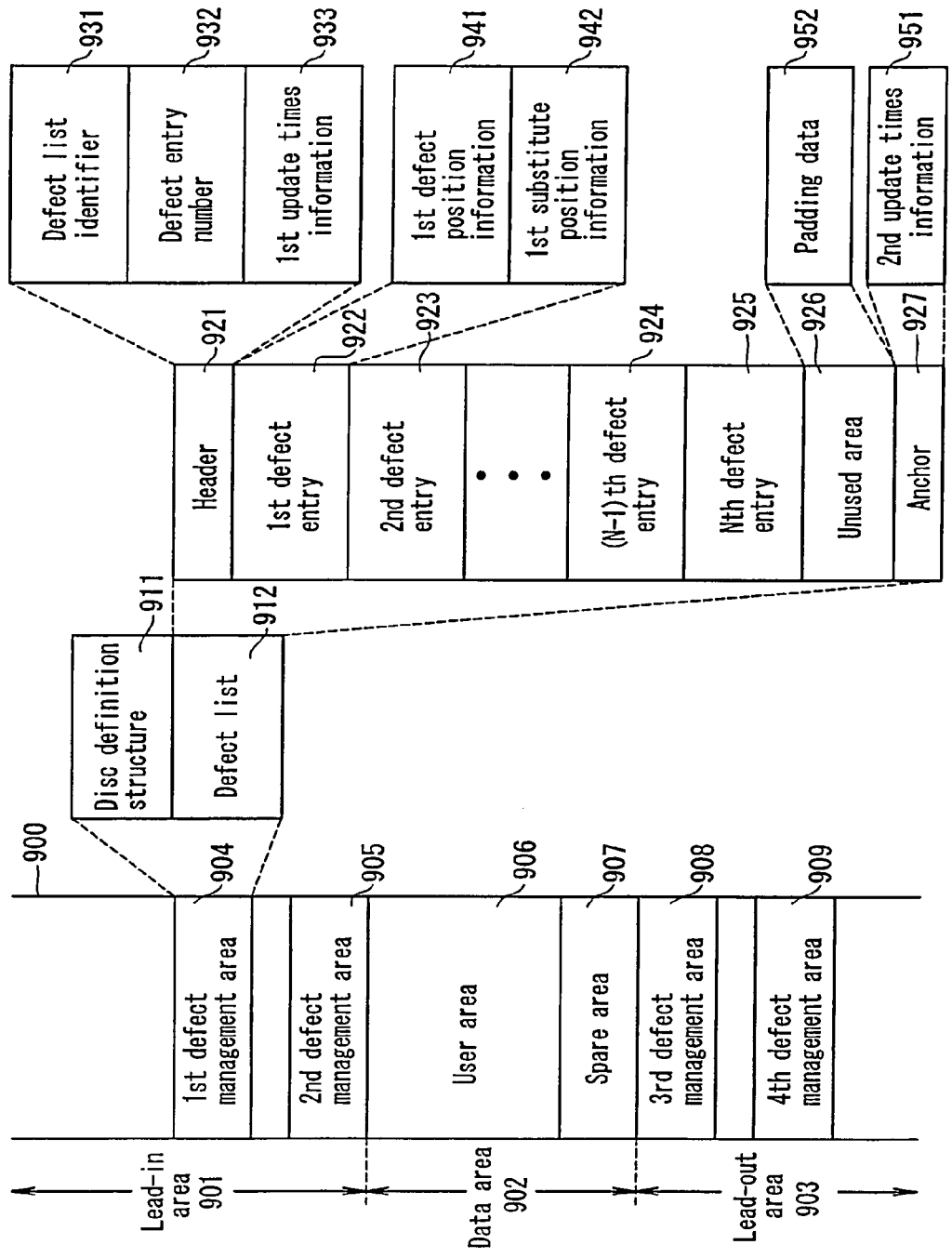
FIG. 9 shows a data structure of an information recording medium 900 according to a second example of the present invention.

FIG. 9 shows a data structure of an information recording medium 900 according to a second example of the present invention.

The information recording medium (optical disc) 900 may be, for example, a rewritable optical disc. The optical disc 900 is assumed to be subjected to error correction in units of 1ECC block. An ECC block is a unit of error correction in the field of optical discs. This size of one ECC block will be referred to as "1ECC size", hereinafter. It is assumed that the recording of information on the optical disc 900 and updating of the information on the optical disc 900 are performed in units of 1ECC block.

The data structure shown in FIG. 9 is the structure of the optical disc 900 after position information on N number of defect areas in a defect management area is normally recorded (N is an integer satisfying N≧0). A defect area is, for example, a defect sector.

The optical disc 900 includes a data area 902 for recording user data, and a lead-in area 901 and a lead-out area 903 acting as buffer areas when a recording and reproduction apparatus (not shown) overruns by the movement of an optical head (not shown).

The data area 902 includes a user area 906 for recording user area and a spare area 907. When there is a defect area (for example, a defect sector) in the user area 906, the user data which is to be recorded in the defect area is recorded in the spare area 907 instead of a portion of the user area 906 corresponding to the defect area.

The lead-in area 901 includes a first defect management area 904 and a second defect management area 905 for recording defect management information used for managing a defect area existing in the data area 902.

The lead-out area 903 includes a third defect management area 908 and a fourth defect management area 909 for recording defect management information used for managing a defect area existing in the data area 902, like the lead-in area 901.

The first defect management area 904, the second defect management area 905, the third defect management area 908, and the fourth defect management area 909 are respectively located at physically specific positions in the optical disc 900.

In the first defect management area 904, the second defect management area 905, the third defect management area 908 and the fourth defect management area 909, the same information for defect management is recorded in multiplex. The reason for this is, as described above in the first example, that the information recorded in the first, second, third and fourth defect management areas 904, 905, 908, and 909 cannot be a target of defect management. Even if some of the first, second, third and fourth defect management areas 904, 905, 908, and 909 have a defect area and the information recorded in the defect area cannot be reproduced, as long as at least one of the four defect management areas is defect-free, the defect management information recorded in that area can be normally reproduced. Accordingly, loss of the user data is prevented, which improves reliability. In the second example, the optical disc 900 includes the four defect management areas 904, 905, 908, and 909, but the number of defect management areas may be any number of one or more.

In the first defect management area 904, a disc definition structure 911 and a defect list 912 for managing N number of defect areas existing in the data area 902 (N is an integer satisfying N≧0) are recorded.

The disc definition structure 911 is information representing the disc structure, for example, whether or not the disc 900 has been subjected to defect management. This information also includes information regarding the spare area 907. The disc definition structure 911 is located at a physically specific position in the first defect management area 904. The disc definition structure 911 has a prescribed size.

The defect list 912 includes a header 921, a first defect entry 922, a second defect entry 923, . . . , an (N−1)th defect entry 924, an Nth entry 925, and an anchor 927 located at a fixed position in the defect list 912. The defect list 912 further includes an unused area 926, unlike in the first example. The header 921, the first through Nth entries 922 through 925, and the anchor 927 are located in this order in the defect list 912.

In the second example, it is assumed that the size of the defect list 912 is 4ECC. The size of the defect list 912 is not limited to 4ECC and is arbitrary.

The header 921 includes a defect list identifier 931 which represents that the area is the defect list 912, a defect entry number 932 which represents the number of defect entries included in the defect list 912, and first update times information 933 which represents the number of times which an updated defect list has been recorded in the first defect management area 904. In FIG. 9, the defect entry number 932 is N (N is an integer satisfying N≧0), and the content of the first update times information 933 is M (M is an integer satisfying M≧0). The defect list identifier 931 may be located, for example, at the start of the header 921 shown in FIG. 9.

The header 921 is located at a physically specified position. In the second example, the header 921 is located at the start of the defect list 912. The position of the header 921 in the defect list 912 is arbitrary as long as the header 921, the first through Nth defect entries 922 through 925, and the anchor 927 are located in this order in the defect list 912.

In the case of the optical disc 900 shown in FIG. 9, the defect entry number 932 is N. Thus, the defect list 912 includes the first defect entry 922, . . . , and the Nth defect entry 925. The first defect entry 922 includes first defect position information 941 which is position information showing the position of a defect area, and first substitute position information 942 which is position information showing the position of a part of the spare area 907 which is usable instead of the defect area. Likewise, the second defect entry 923 includes second defect position information and second substitute position information. The (N−1)th defect entry 924 and the Nth defect entry 925 also have substantially the same structure. Here, each of the first defect position information 941 and the first substitute position information 942 is generally a sector number.

The defect entries are generally located such that the defect position information included therein is in an ascending order. More specifically, when, for example, the defect position information is a sector number, defect position information having the smaller sector number is located in the first defect entry as the first defect position information 941. After this, the defect entries are located in the order of the sector numbers. Defect position information having the larger sector number is located in the Nth defect entry 925 as Nth defect position information.

The defect entries in the defect list 912 do not need to be located in an ascending order. For example, the defect entries may be located such that the sector numbers are in a descending order. Alternatively, the defect entries may be located randomly.

In the unused area 926, currently meaningless information is recorded. Generally, padding data 952 (for example, 0) is recorded in the unused area 926. When a new defect area is detected in the user area 906, a defect entry for managing the new defect area is added to the defect list 912. As a result, the size of the unused area 926 is decreased by the size of the added defect entry.

The anchor 927 includes second update times information 951 which represents the number of times which the updated defect list has been recorded in the first defect management area 904. In FIG. 9, the content of the second update times information 951 is M (M is an integer satisfying M≧0), and is the same as that of the first update times information 933. As long as the first defect management area 904 is updated normally, the content of the first update times information 933 and the content of the second update times information 951 are identical to each other.

In this specification, the first and second update times information 933 and 951 represent the number of times which the updated defect list has been recorded in the first defect management area 904 (i.e., the number of times which the defect list 912 has been updated and recorded on the optical disc 900). The first and second update times information 933 and 951 may represent the number of times which the defect list has been updated (i.e., the number of times which the defect list has been updated in the storage section described below). In the following description, the first and second update times information 933 and 951 represent the number of times which the updated defect list has been recorded in the first defect management area 904.

The anchor 927 is located at a fixed position in the defect list 912, unlike in the first example. The anchor 927 is preferably located which is determined based on the position of the header 921. In the second example, the anchor 927 is located at the position of the end of the defect list 912, i.e., at the end of the first defect management area 904. Since the size of the defect list 912 is fixed at 4ECC, the anchor 927 is located at the end of the fourth ECC block from the start of the defect list 912. However, as long as the header 921, the 1st through Nth defect entries 922 through 925, and the anchor 927 are located in the defect list 912 in this order, the anchor 927 may be fixed at an arbitrary position in the defect list 912.

In the optical disc 900 in the second example, the anchor 927 is located at a physically fixed position in the defect list 912. The header 921 includes the first update times information 933, and the anchor 927 includes the second update times information 951. Since the position of the anchor 927 is fixed, the content of the first update times information 933 and the content of the second update times information 951 are compared with each other without fail. Accordingly, it can be easily determined whether or not the defect list 912 has been updated normally.

The following description will be made with the premise that the optical disc 900 has the data structure shown in FIG. 9.

(2) Reproduction/Recording (Update)

The recording and reproduction apparatus 300 shown in FIG. 3 is used for recording information on the optical disc 900 according to the second example and/or reproducing information recorded on the optical disc 900. Unlike in the first example, the control section 301 in the second example has only an inherent defect list identifier for identifying the defect list 912 in the optical disc 900 stored thereon. The content (value) of the inherent defect list identifier is correct and is not rewritable. The description of the recording and reproduction apparatus 300 shown in FIG. 3 is provided in the first example and will not be repeated here.

(2-1) Defect Management Processing for Specifying the Latest Defect List

Next, with reference to FIG. 3, the operation of defect management processing for specifying the latest defect list performed by the recording and reproduction apparatus 300 will be described.

The control section 301 executes the defect management processing. The control section 301 follows the procedure of the defect management processing to request the recording and reproduction section 302 to reproduce the information of the disc definition structure 911 located at the start of the first defect management area 904 and store the reproduced information from the disc definition structure 911 in the storage section 303.

Upon the request from the control section 301, the recording and reproduction section 302 reproduces the information of the disc definition structure 911 from the optical disc 900 and stores the information in the storage section 303. The recording and reproduction section 302 reports to the control section 301 that the reproduction and storage of the information of the disc definition structure 911 has been completed.

Upon receiving the report from the recording and reproduction section 302, the control section 301 checks whether or not the optical disc 900 has been subjected to defect management, based on the information of the disc definition structure 911 stored in the storage section 303.

When confirming that the optical disc 900 has been subjected to defect management, the control section 301 requests the recording and reproduction section 302 to reproduce the header 921 located at a fixed position of the defect list 912 (in the example of FIG. 9, at the start of the defect list 912) recorded in the first defect management area 904 and store the reproduced header 921 in the storage section 303.

Upon the request from the control section 301, the recording and reproduction section 302 reproduces the header 921 located at the start of the defect list 912 recorded in the first defect management area 904 and store the reproduced header 921 in the storage section 303. The recording and reproduction section 302 reports to the control section 301 that the reproduction and storage of the header 921 has been completed.

Upon receiving the report from the recording and reproduction section 302, the control section 301 compares the content of the inherent defect list identifier initially stored in the control section 301 with the content of the defect list identifier 931 included in the header 921 stored in the storage section 303 to check whether or not the stored information is the header 921 in the defect list 912.

When the two contents compared match each other, the control section 301 determines that the stored information is the header 921 in the defect list 912 and proceeds with the defect management processing. When the two contents compared do not match each other, the control section 301 determines that updating of the first defect management area 904 failed (abnormal defect management area) and terminates the defect management processing. The two contents compared do not match each other when, for example, there is a defect area in the first defect management area 904 and thus information cannot be read therefrom.

In order to confirm the content of the first update times information 933 and the content of the second update times information 951 in the first defect management area 904, the control section 301 requests the recording and reproduction section 302 to reproduce the anchor 927 located at the fixed position in the defect list 912 (in FIG. 9, at the end of the fourth ECC block from the start of the defect list 912) and store the reproduced anchor 927 in the storage section 303.

Upon the request from the control section 301, the recording and reproduction section 302 reproduces the anchor 927 located at the designated position in the defect list 912 and stores the reproduced anchor 927 in the storage section 303. The recording and reproduction section 302 reports to the control section 301 that the reproduction and storage of the anchor 927 has been completed.

The control section 301 compares the content of the first update times information 933 included in the header 921 with the content of the second update times information 951 included in the anchor 927 stored in the storage section 303.

When the two contents compared match each other, the control section 301 determines that the first defect management area 904 has been updated normally, and proceeds with the defect management processing.

When the two contents compared do not match each other, the control section 301 determines that updating of the first defect management area 904 failed (abnormal defect management area) and terminates the defect management processing. The two contents compared do not match each other when, for example, the recording and reproduction apparatus 300 is turned off while the first through Nth defect entries 922 through 925 in the defect list 912 are being updated. In this case, the content of the first update times information 933 included in the header 921 does not match the content of the second update times information 951 included in the anchor 927.

The control section 301 performs substantially the same processing for each of the second defect management area 905, the third defect management area 908 and the fourth defect management area 909.

After checking whether or not each of the first through fourth defect management areas 904, 905, 908 and 909 is a normal defect management area, the control section 301 specifies the latest defect management area among the defect management areas which have been determined to be normal, as follows. The control section 301 makes a comparison of the first update times information 933 recorded in the defect management areas which have been determined to be normal, and specifies the defect management area having the largest number of updates as the latest defect management area. The defect list recorded in the specified latest defect management area is specified as the latest defect list.

The second update times information 951 included in the anchor 927 may be used for specifying the latest defect management area instead of the first update times information 933.

The control section 301 requests the recording and reproduction section 302 to reproduce the defect list recorded in the specified latest defect management area and store the reproduced defect list in the defect list area saved in the storage section 303.

Upon the request from the control section 301, the recording and reproduction section 302 reproduces the defect list recorded in the specified latest defect management area and stores the reproduced defect list in the defect list area in the storage section 303. The recording and reproduction section 302 reports to the control section 301 that the reproduction and storage of the defect list has been completed.

Thus, the operation of defect management processing for specifying the latest defect list performed by the recording and reproduction apparatus 300 is completed.

Using the specified latest defect list, the user data recorded in the data area 902, for example, can be reproduced. In this case, the control section 301 requests the recording and reproduction section 302 to reproduce the user data based on the latest defect list and store the reproduced user data in the storage section 303.

Upon the request from the control section 301, the recording and reproduction section 302 reproduces the user data from the data area 902 and stores the reproduced user data in the storage section 303.

Information recording may be performed using the specified latest defect list.

Figure 10:
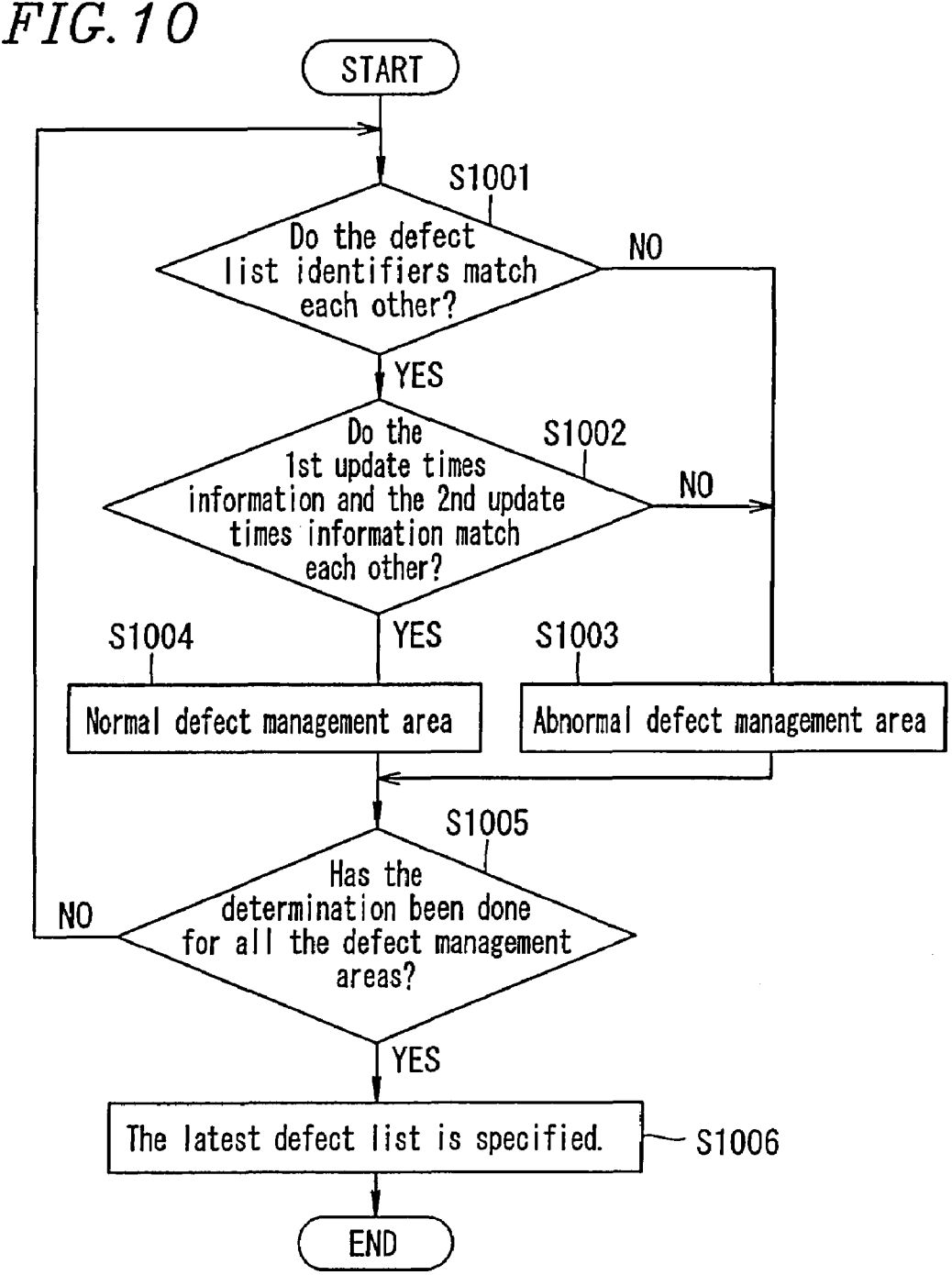
FIG. 10 is a flowchart illustrating a procedure of defect management processing for specifying the latest defect list in the second example.
Figure 12:
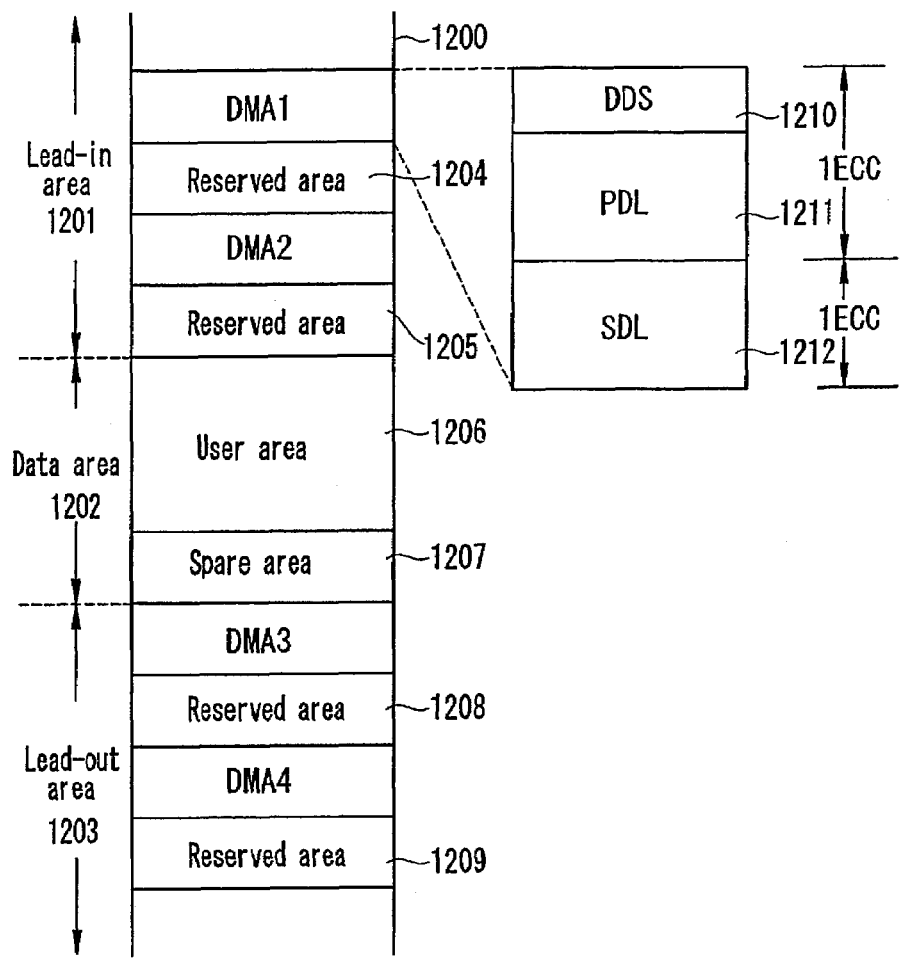
FIG. 12 shows a data structure of an information recording medium 1200 according to the DVD-RAM Standards.
Figure 13:
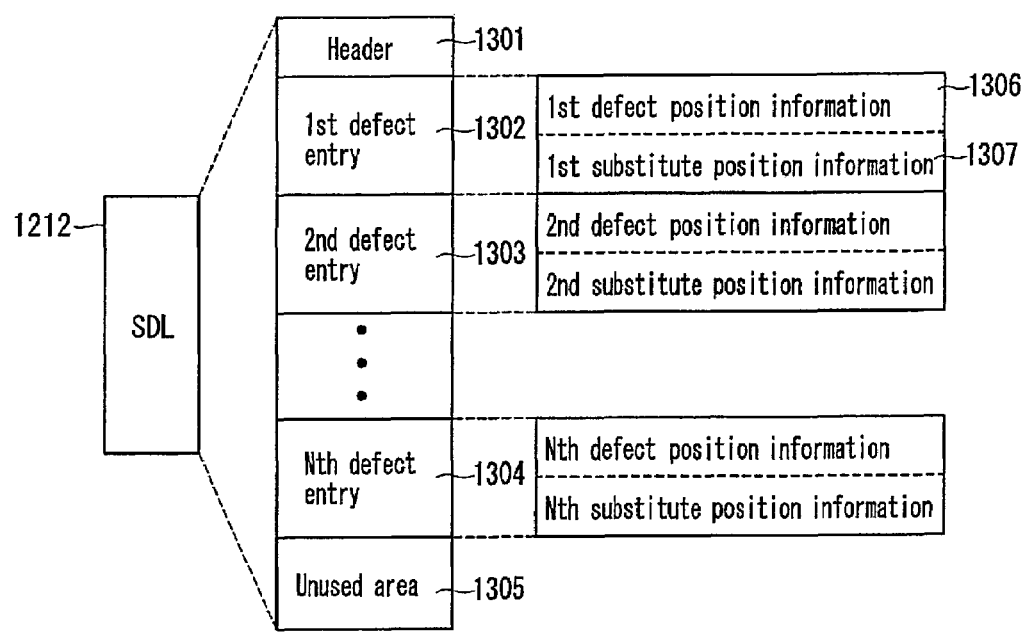
FIG. 13 shows a detailed data structure of an SDL 1212.
Figure 14:
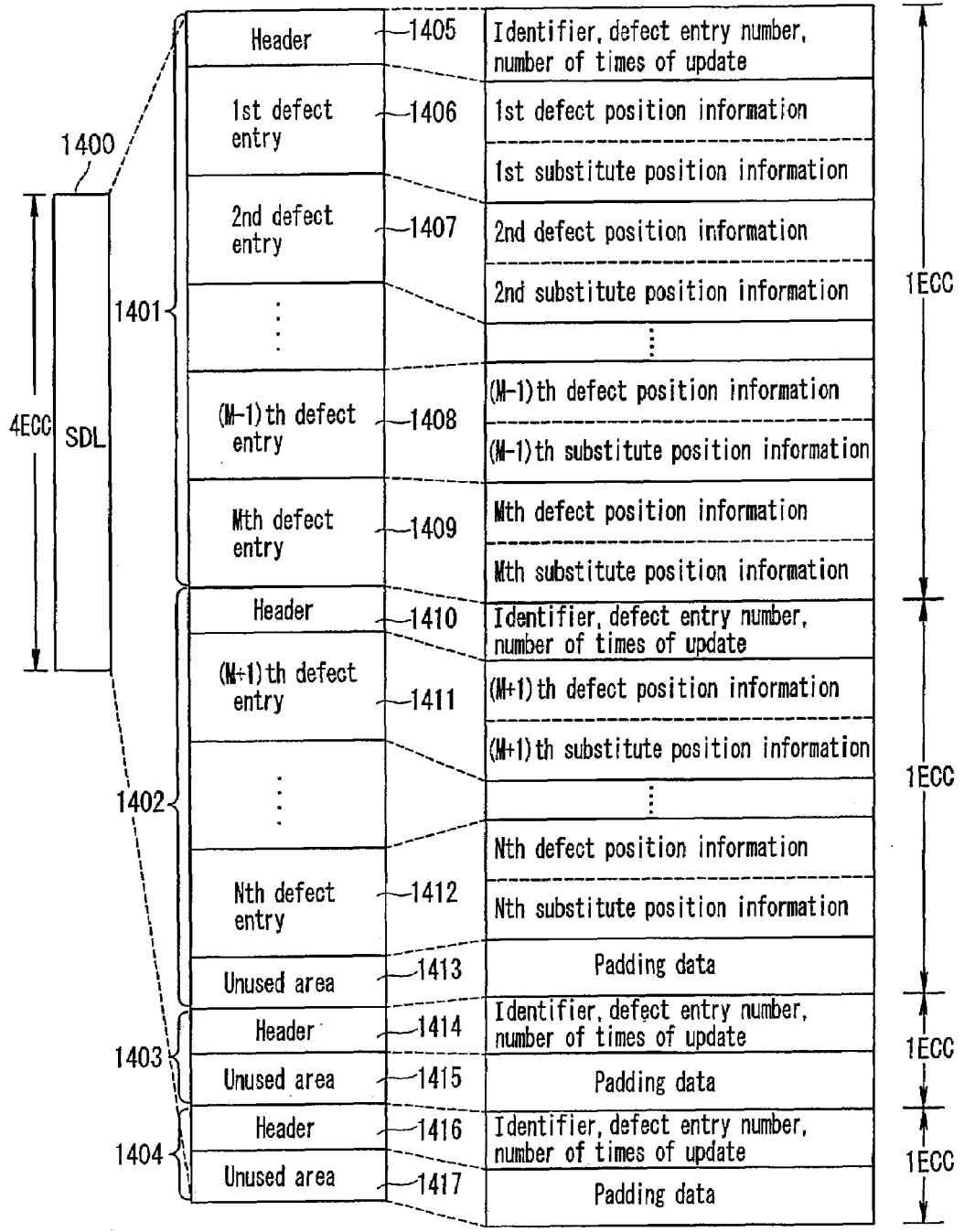
FIG. 14 shows a data structure of an SDL 1400 having 4ECC size.
Figure 15:
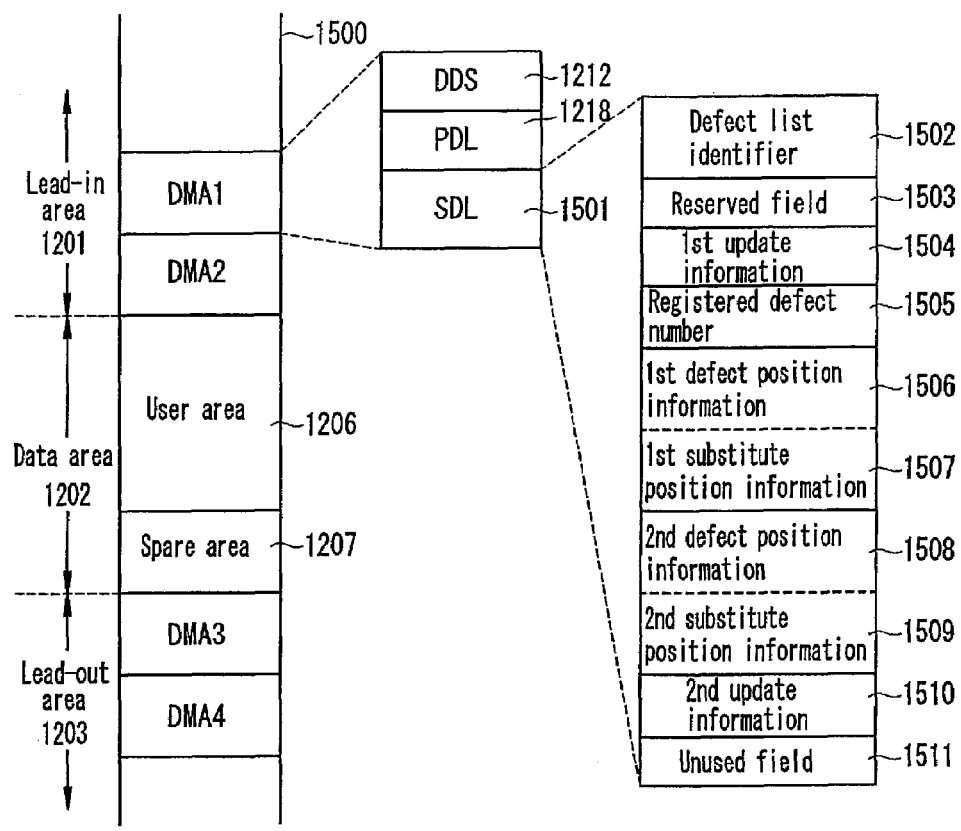
FIG. 15 is a data structure of another conventional information recording medium 1500.
Figure 16:
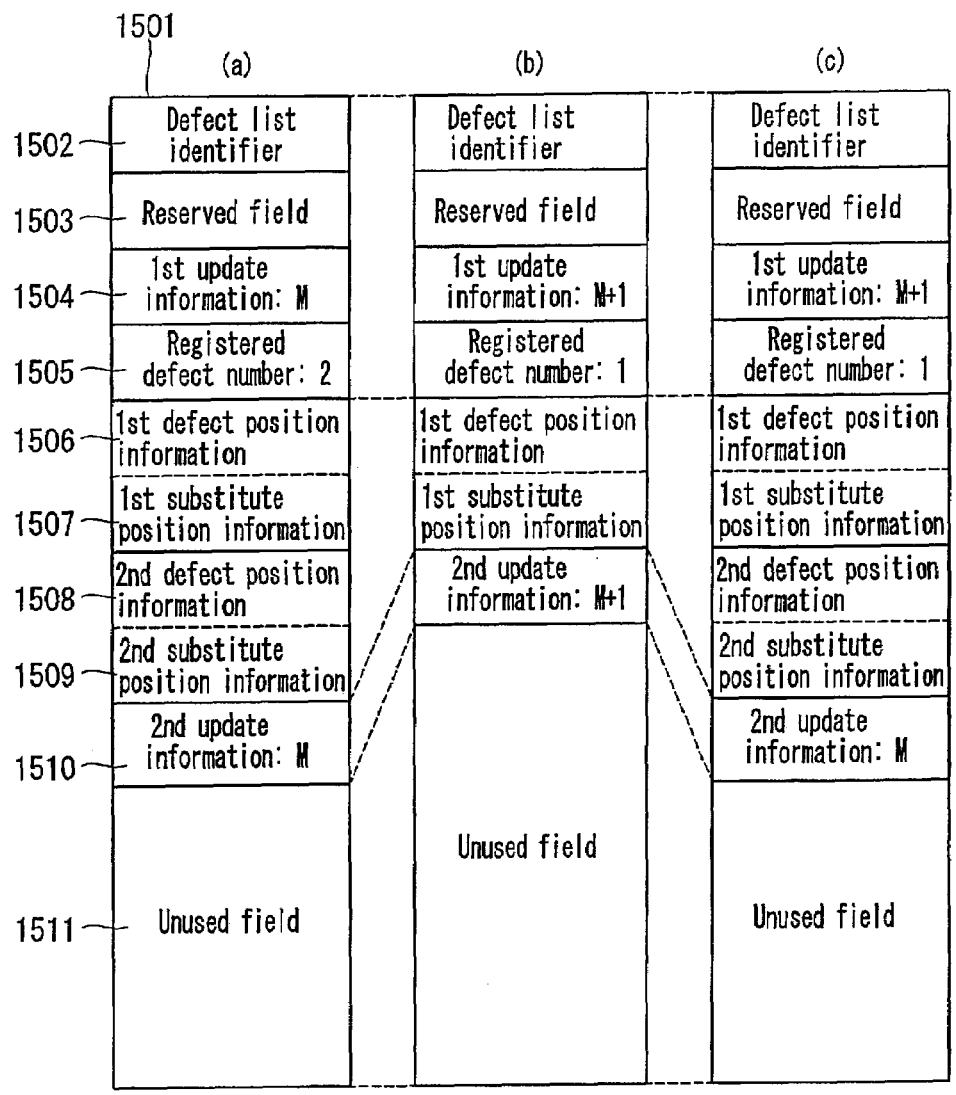
FIG. 16 shows a data structure of an SDL 1501 of the information recording medium 1500 shown in FIG. 15 in various states of (a) before update, (b) when the defect list has been updated normally and (c) when the defect list has not been updated normally.

FIG. 10 shows a procedure of defect management processing for specifying the latest defect list in the second example. The defect management processing is executed by the control section 301. Hereinafter, each step of the procedure of defect management processing will be described. The procedure of defect management processing is started after it is confirmed that the optical disc 900 has been subjected to defect management. Whether or not the optical disc 900 has been subjected to defect management is determined based on the disc definition structure 911 in the optical disc 900.

Step S1001: The defect list identifier 931, the defect entry number 932 and the first update times information 933 included in the header 921 are reproduced. The content of the reproduced defect list identifier 931 is compared with the content of the inherent defect list identifier. The inherent defect list identifier identifies the defect list 912 in the optical disc 900. The inherent defect list identifier has a correct value which is not rewritable. The inherent defect list identifier may be initially stored in the control section 301. When the two contents compared match each other, the defect management processing advances to step S1002. When the two contents compared do not match each other, the defect management processing advances to step S1003.

Step S1002: When the content of the defect list identifier 931 and the content of the inherent defect list identifier are determined to match each other in step S1001, the reproduced information is determined to be the header 921 in the defect list 912. The anchor 927 located at a fixed position (in FIG. 9, at the position of the fourth ECC block from the start of the defect list 912) is reproduced. The content of the first update times information 933 included in the header 921 is compared with the content of the second update times information 951 included in the anchor 927. When the two contents compared are determined to match each other, the defect management processing advances to step S1004. When the two contents compared are determined not to match each other, the defect management processing advances to step S1003.

Step S1003: When the content of the defect list identifier 931 and the content of the inherent defect list identifier are determined not to match each other in step S1001, or when the content of the first update times information 933 and the content of the second update times information 951 are determined not to match each other in step S1002, updating of the first defect management area 904 is determined to have failed (abnormal defect management area), and the defect management processing for the first defect management area 904 is terminated. The defect management processing advances to step S1005.

Step S1004: When the content of the first update times information 933 and the content of the second update times information 951 are determined to match each other in step S1002, the first defect management area 904 is determined to have been updated normally. Then, the defect management processing advances to step S1005.

Step S1005: It is determined whether or not the operations in steps S1001 through S1004 have been performed for all the defect management areas in the optical disc 900. When the operations in steps S1001 through S1004 have not been performed for all the defect management areas, the defect management processing returns to step S1001. When the operations in steps S1001 through S1004 have been performed for all the defect management areas, the defect management processing advances to step S1006.

Step S1006: The latest defect list is specified. More specifically, the latest defect management area among the defect management areas determined to be normal is specified, as follows. A comparison is made of the first update times information (or the second update times information) recorded in the defect management areas determined to be normal, and the defect management area having the largest number of updates is specified as the latest defect management area. The defect list recorded in the specified latest defect management area is specified as the latest defect list.

When the latest defect list of the optical disc 900 is specified by steps S1001 through S1006, the defect management processing is completed. Using the latest defect list obtained in step S1006, the user data recorded in the data area 902, for example, can be reproduced.

(2-2) Defect Management Processing for Updating the Latest Defect List

Returning to FIG. 3, the operation of defect management processing for updating the latest defect list performed by the recording and reproduction apparatus 300 will be described. In the following example, the defect list is updated when another defect area is detected while the user data is being recorded in the data area 902 of the optical disc 900, or when a portion of the user area 906 which was previously determined to be a defect area is determined to be a normal defect area while the user data recorded in the data area 902 is being reproduced. Throughout this specification, a "normal defect area" is defined to mean an area which was previously determined to be a defect area but currently has no defect and allows information to be recorded therein and/or allows information therein to be reproduced. An area which was previously determined to be a defect area is currently determined to be a normal defect area when, for example, the defect is caused by dust or stain such as a fingerprint on the surface of the optical disc. In this case, when the user cleans the surface of the optical disc to remove the dust or stain, the area in which the dust or stain existed (i.e., the area which was previously determined to be a defect area) is currently determined to be a normal area usable for recording/reproduction.

The storage section 303 stores the latest defect list. The latest defect list may be located in the defect list area in the storage section 303. The latest defect list includes the latest header, P number of latest defect entries (P is an integer satisfying $P \geqq 0$ where P=N or P≠N), and the latest anchor. The latest header, the P number of latest defect entries, and the latest anchor are located in the latest defect list in this order. The latest header is located at a fixed position in the latest defect list. The latest anchor is also located at a fixed position in the latest defect list. The latest header includes the latest defect list identifier, the first latest update times information and the latest defect entry number P. The content of the latest defect list identifier is always the same as that of the inherent defect list identifier stored in the control section 301. The latest anchor includes the second latest update times information which has the same content as that of the first latest update times information. It is assumed that the P number of latest defect entries are arranged in an ascending order of the defect position information (defect sector numbers). The latest defect list may include an unused area. It is not always necessary that the latest header includes the latest defect list identifier.

The above-described arrangement of the latest header and the P number of latest defect entries and the latest anchor is merely an example. The arrangement of the latest header and the P number of latest defect entries and the latest anchor in the latest defect list is arbitrary.

The control section 301 executes the defect management processing. The control section 301 requests the recording and reproduction section 302 to determine whether (a) another defect area exists in the data area 902, (b) a defect area which was previously determined to be a defect area is currently a normal defect area, or (c) neither (a) nor (b) is the case. Whether or not another defect area exists in the data area 902 is determined by, for example, comparing a signal obtained by reproducing data immediately after user data is recorded with a signal representing user data to be recorded. When these signals match each other, the user data is determined to have been normally recorded in the data area 902. When these signals do not match each other, it is determined that the user data has not been normally recorded in the data area 902 and another defect area exists in the data area 902.

When determining that another defect area exists in the data area 902 or that the area which was previously determined to be a defect area is currently a normal defect area, the control section 301 updates the latest defect list stored in the storage section 303.

Specific procedures of updating the latest defect list will be described. There are three cases of updating the latest defect list, namely, (i) addition of a defect entry, (ii) deletion of a defect entry; and (iii) change of a defect entry. Each of these cases will be described one by one.

(i) Addition of a Defect Entry

When it is determined that another defect area exists in the user area 906, a defect entry including the position information on the position of the another defect area is added to the latest defect list. Based on the defect position information on the detected defect area, the control section 301 determines the position of the defect entry to be added. The control section 301 shifts the other defect entries and the latest anchor existing subsequent to the determined position toward the unused area, and adds the defect entry including the position information on the another defect area at the determined position. As a result, the P number of latest defect entries are updated to P' number of latest defect entries (P≠P', P<P').

Following the addition of the defect entry, the control section 301 updates the latest defect entry number from P into P'. In this case, the latest defect entry number is increased by the number of the added defect entries (i.e., by the number of the detected defect sectors).

After the P number of latest defect entries and the latest defect entry number P are updated, the control section 301 increments, by one, the content of the first latest update times information included in the latest header and the content of the second latest update times information included in the latest anchor.

(ii) Deletion of a Defect Entry

When an area which was previously determined to be a defect area is currently determined to be a normal defect area, the control section 301 deletes the defect entry including the position information on the area determined to be the normal defect area. The control section 301 then shifts the defect entries located subsequent to the deleted defect entry toward the latest header by the size of the deleted defect entry. The unused area is expanded by the size of the deleted defect entry, and the control section 301 records padding data (for example, 0) in the expanded portion of the unused area. As a result, the P number of latest defect entries are updated to P' number of latest defect entries (P≠P', P>P').

Following the deletion of the defect entry, the control section 301 updates the latest defect entry number included in the latest header from P into P'. In this case, the latest defect entry number is decreased by the number of the deleted defect entries (i.e., by the number of the defect sectors determined to be normal).

After the P number of latest defect entries and the latest defect entry number P are updated, the control section 301 increments, by one, the content of the first latest update times information included in the latest header and the content of the second latest update times information included in the latest anchor.

(iii) Change of a Defect Entry

The operation in this case is the same as the operation described in the first example, and will not be repeated here.

The operations of (i) through (iii) are performed by the control section 301 for the latest defect list stored in the storage section 303. As in the first example, in the case where the first and second update times information 933 and 951 represent the number of times which the updated latest defect list has been recorded in the first defect management area 904, the first and second latest update times information may each be incremented by one only once before the updated latest defect list is recorded in the first defect management area 904. By contrast, in the case where the first and second update times information 933 and 951 represent the number of times which the latest defect list has been updated in the storage section 303, the first and second latest update times information may be incremented by one each time the latest defect entries and the latest defect entry number are updated.

The control section 301 requests the recording and reproduction section 302 to record the latest defect list updated in the storage section 303 in the first defect management area 904 of the optical disc 900. For example, the control section 301 requests the recording and reproduction section 302 to record the updated latest header, the updated P' number of latest defect entries, and the updated latest anchor in the first defect management area 904 in this order.

Upon the request from the control section 301, the recording and reproduction section 302 records the updated latest defect list in the first defect management area 904. The updated defect list replacing the defect list 912 is recorded in the first defect management area 904 in the order of the latest header replacing the header 921, the latest defect entries replacing the first through Nth defect entries 922 through 925, and the latest anchor replacing the anchor 927. The recording and reproduction section 302 reports to the control section 301 that the recording of the updated latest defect list in the first defect management area 904 has been completed. Unlike in the first example, the anchor 927 is located at the fixed position, i.e., at the end of the fourth ECC block from the start of the defect list 912 in the optical disc 900 in the second example. Therefore, even when the total size of the header 921 and the defect entries in the defect list 912 is accommodated in 1ECC size, data of at least two ECC blocks, i.e., the data for the first ECC block and the data for the fourth ECC block need to be recorded.

The control section 301 requests the recording and reproduction section 302 to record the latest defect list updated in the storage section 303 in each of the second through fourth defect management areas 905, 908 and 909. More specifically, again, the control section 301 requests the recording and reproduction section 302 to record the updated latest header, the updated latest defect entries, and the updated latest anchor in this order in the second through fourth defect management areas 905, 908 and 909.

Upon the request from the control section 301, the recording and reproduction section 302 records the updated latest defect list in each of the second through fourth defect management areas 905, 908 and 909.

Thus, the operation of defect management processing for updating the latest defect list performed by the recording and reproduction apparatus 300 is completed.

The order of recording the updated latest defect list is not limited to the above-described order of the latest header, the P' number of latest defect entries, and the latest anchor. As long as the header 921, the N number of defect entries 922 through 925, and the anchor 927 are located in this order in the defect list 912, the control section 301 may request the recording and reproduction section 302 to record the updated latest anchor, the P' number of latest defect entries, and the latest header in this order in each of the first through fourth defect management areas 904, 905, 908 and 909, and the recording and reproduction section 302 may record the updated latest defect list in each of the first through fourth defect management areas 904, 905, 908 and 909 upon the request from the control section 301.

Returning to FIG. 5, a procedure of defect management processing for updating the latest defect list in the second example will be described. The defect management processing is executed by the control section 301. The operations in steps S501 through S503 and S505 are substantially the same as those of the first example, and will not be repeated here.

Step S504: The updated latest defect list is recorded in the first defect management area 904 of the optical disc 900. For example, the updated latest header, the updated P' number of latest defect entries, and the updated latest anchor are recorded in the first defect management area 904 in this order. As long as the header 921, the N number of defect entries 922 through 925, and the anchor 927 are located in this order in the defect list 912, the updated latest anchor, the updated P' number of latest defect entries, and the updated latest header may be recorded in this order in the first defect management area 904. In the optical disc 900, the anchor 927 is located at the fixed position in the defect list 912 (in FIG. 9, at the end of the fourth ECC block from the start of the defect list 912). Therefore, even when the total size of the header 921 and the defect entries in the defect list 912 is accommodated in 1ECC size, data of at least two ECC blocks, i.e., the data for the first ECC block and the data for the fourth ECC block are recorded.

As described above, the arrangement of the latest header, the P' number of latest defect entries and the latest anchor in the latest defect list is arbitrary. The updated latest defect list is recorded in each of the first through fourth defect management areas 904, 905, 908 and 909 of the optical disc 900 as follows. Such that the updated latest header is located at the position of the header 921, the updated P' number of latest defect entries are located at the positions of the defect entries 922 through 925, and the updated latest anchor is located at the position of the anchor 927, the updated latest defect list is recorded in each of the first through fourth defect management areas 904, 905, 908 and 909 in the order of the updated latest header, the updated P' number of latest defect entries, and the updated latest anchor or in the order of the updated latest anchor, the updated P' number of latest defect entries, and the updated latest header.

In the above description, the updated latest defect list is recorded on the optical disc 900 shown in FIG. 9 where the optical disc 900 has been subjected to defect management. Next, recording of the updated latest defect list on an optical disc in an initial state immediately after being shipped from the plant will be described.

An optical disc in an initial state is assumed to have the same structure as that shown in FIG. 9 except that, for example, the defect list 912 (FIG. 9) has no information. In such optical disc, no defect list identifier for identifying the defect list is recorded. Therefore, in the case where the latest defect list does not include the latest defect list identifier, the defect management processing of recording the latest defect list includes the process of recording the defect list identifier in addition to the process of recording the latest defect list in the defect management area. In the case where the latest defect list includes the latest defect list identifier, no detailed explanation will be given since the processing was described above with reference to FIG. 5.

The control section 301 requests the recording and reproduction section 302 to record the latest defect list stored in the storage section 303 in the defect management area of the optical disc and to record the inherent defect list identifier, which is initially stored in the control section 301, in the defect management area of the optical disc. More specifically, the inherent defect list identifier is recorded in the defect management area so as to be located at the start of the header 921. In this case, an arbitrary value is recorded as the latest defect entry number and as the latest defect entry of the latest defect list which respectively correspond to the defect entry number 932 and the first through Nth defect entries 922 through 925. As the first update times information and as the second update times information, for example, 0 or 1 is recorded. The values to be recorded as the first and second update times information are arbitrary as long as the values are equal to each other and represent that recording has been performed on an optical disc in the initial state only once.

The method for recording the defect list identifier in the defect management area is not limited to the above-described method. For example, the inherent defect list identifier already stored in the control section 301 is given as the latest defect list identifier at the start of the latest header of the latest defect list stored in the storage section 303. As the defect management processing performed on an optical disc in the initial state, the latest defect list including the latest defect list identifier obtained in this manner may be recorded in the defect management area.

This process of defect management processing is performed in steps S504 and S505 in FIG. 5.

In the second example, it is accurately determined whether or not the defect management area has been updated normally. This will be described below. In the following explanation, the optical disc 900 is used.

SPECIFIC EXAMPLE 1

When a Defect Entry is Added

FIG. 11 shows data structures of a defect list in various states. Part (a) shows a data structure of a pre-update defect list. Part (b) shows a data structure of a defect list which was updated normally. Part (c) shows a data structure of a defect list which was not updated normally.

FIG. 11 shows the case where another defect area (defect sector) is detected in the user area 906 and one defect entry is added. The addition of the defect entry is performed as described above with reference to FIGS. 3 and 5.

Part (a) of FIG. 11 shows a data structure before the defect list is updated. The defect list shown in part (a) is the same as the defect list 912 shown in FIG. 9. The defect list includes a first defect entry, . . . , and an Nth defect entry. The defect entry number is N, and the content of each of the first update times information and the second update times information is M.

Part (b) of FIG. 11 shows a data structure after the defect list is updated normally (one defect entry is added normally). When one defect entry is added normally to the defect list, the defect list includes the first defect entry, . . . , the Nth defect entry, and an (N+1)th defect entry. The number of defect entries is increased by one from the state in part (a) of FIG. 11. The defect entry number is updated from N to N+1. The content of each of the first update times information and the second update times information is updated from M to M+1.

Following the addition of the defect entry, the size of the unused area is decreased by the size of the added defect entry like Specific example 1, but the position of the anchor is fixed. The content of the first updated times information matches the content of the second updated times information. Thus, it can be determined that the defect list has been updated normally.

Part (c) of FIG. 11 shows a data structure of a defect data in the case where the update failed before the anchor is recorded. The failure occurs when, for example, the recording and reproduction apparatus 300 is turned off while the defect list is being updated. In part (c) of FIG. 11, the defect list includes the first defect entry, . . . , and the Nth defect entry, like in part (a) of FIG. 11. Although the defect list includes the same defect entries as those of part (a) of FIG. 11, the defect entry number is updated from N to (N+1). The content of the first update times information is updated from M to (M+1). However, the content of the second update times information is M like in part (a) of FIG. 11. Since the content of the first updated times information does not match the content of the second updated times information, it is determined that the updating of the defect list failed.

In the case where a defect entry is changed or a defect entry is deleted, it can be determined whether or not the defect list has been updated normally by comparing the content of the first update times information and the content of the second update times information in substantially the same manner.

In the second example, the anchor 927 includes only the second update times information 951. As in the first example, the anchor 927 may also include an anchor identifier for identifying the anchor in the defect list 912. In this case also, the same effect as described in the second example can be provided.

In the second example, the header 921 includes the defect list identifier 931. The header 921 is located at a physically specified position in the optical disc 900 and therefore does not need to include the defect list identifier 931. Even without the defect list identifier 931, the same effect as described in the second example can be provided.

As described above, according to the second example of the present invention, the information recording medium 900 includes the data area 902 for recording user data, and the defect management areas 904, 905, 908 and 909 for recording a defect list used for managing N number of defect areas existing in the data area 902 (N is an integer satisfying N≧0). The defect list 912 includes the header 921, the N number of defect entries respectively including the position information on the positions of the N number of defect areas, and the anchor 927 located at a fixed position in the defect list 912. The header 921 includes the first update times information 933, and the anchor 927 includes the second update times information 951.

Since the anchor 927 is located at the fixed position, other information is never erroneously reproduced as the anchor 927. Namely, the content of the first update times information 933 and the content of the second update times information 951 can be compared with each other without fail. Accordingly, it can easily be determined whether or not the defect list 912 has been updated normally.

Again, since the anchor 927 is located at the fixed position, it is not necessary to calculate the position of the anchor 927 and check whether or not the anchor 927 is located at the calculated position as is necessary in the first example, in order to reproduce the anchor 927. Therefore, the processing of defect management can be simplified and improved in speed.

It is not necessary to provide a header for each 1ECC size even when the size of the defect list 912 is not accommodated in 1ECC size. Thus, the processing efficiency of updating the defect list 912 is improved. Since the header is not interposed between the two defect entries, defect entries can be, for example, searched for, added and deleted easily.

As described above, an information recording medium according to the present invention includes a data area for recording user data and a defect management area for recording a defect list used for managing N number of defect areas (N is an integer satisfying N≧0) existing in the data area. The defect list includes a header, N number of defect entries respectively including the position information on the positions of the N number of defect areas, and an anchor. The header, the N number of defect entries, and the anchor are located in this order in the defect list. Owing to such a structure, the size of the defect list is variable, and therefore the processing speed is improved in accordance with the size of the defect list.

With the information recording medium according to the present invention, the header includes a defect list identifier for identifying the defect list, first update times information representing the number of times which the defect list has been updated, and a defect entry number representing the number of defect entries. The anchor includes an anchor identifier for identifying the anchor of the defect list, and second update times information representing the number of times which the defect list has been updated. It is not necessary to provide a header for each 1ECC size even when the size of the defect list is not accommodated in 1ECC size. Thus, the processing efficiency of updating the defect list is improved. Since the header is not interposed between the two defect entries, defect entries can be, for example, searched for, added and deleted easily.

The content of the anchor identifier is different from any of the defect list identifier, the defect entry number, the first update times information, the defect entries, or the second update times information. As such, even when a defect entry is deleted, the information which is erroneously read as the anchor identifier never matches the content of the inherent anchor identifier. Therefore, the defect list is not erroneously determined to have been updated normally when it has not been updated normally.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information recording method for recording information on an information recording medium,
wherein the information recording medium includes:
a data area for recording user data; and
a defect management area for recording a defect list for managing N number of defect areas existing in the data area, where N is an integer number satisfying N≧0,
wherein the defect list includes:
a header located at a fixed position in the defect list;
N number of defect entries, each of which includes position information on the respective positions of the N number of defect areas; and
an anchor,
the header includes: a defect list identifier for identifying the defect list;
first update times information which represents update times of the defect list; and the number N for the defect entires, and
the anchor includes: an anchor identifier for identifying the anchor of the defect list; and second update times information which represents update times of the defect list,
the method including a step that records the defect list in the defect management area, in which both of the first and second update times information represent zero, and in which the header, the N number of defect entries and the anchor are located in this order, if no information is recorded in the defect management area included in the information recording medium.

2. An information recording device for recording information on an information recording medium, wherein the information recording medium includes:
 a data area for recording user data; and
 a defect management area for recording a defect list for managing N number of defect areas existing in the data area, where N is an integer number satisfying $N \geq 0$, wherein the defect list includes:
 a header located at a fixed position in the defect list;
 N number of defect entries, each of which includes position information on the respective positions of the N number of defect areas; and
 an anchor,
 the header includes: a defect list identifier for identifying the defect list;

first update times information which represents update times of the defect list; and the number N for the defect entries, and the anchor includes: an anchor identifier for identifying the anchor of the defect list; and second update times information which represents update times of the defect list, the device comprising a unit that records the defect list in the defect management area, in which both of the first and second update times information represent zero, and in which the header, the N number of defect entries and the anchor are located in this order, if no information is recorded in the defect management area included in the information recording medium.

* * * * *

UNITED STATES PATENT AND TRADEMARK OFFICE
CERTIFICATE OF CORRECTION

PATENT NO. : 7,382,704 B2  
APPLICATION NO. : 11/279821  
DATED : June 3, 2008  
INVENTOR(S) : Yoshihisa Takahashi, Motoshi Ito and Hiroshi Ueda It is certified that error appears in the above-identified patent and that said Letters Patent is hereby corrected as shown below:

Column 46, line 53, "entires", should read -- entries --.

Signed and Sealed this

Fourth Day of November, 2008

JON W. DUDAS  
*Director of the United States Patent and Trademark Office*